United States Patent

Grenn

(10) Patent No.: US 9,582,774 B2
(45) Date of Patent: Feb. 28, 2017

(54) TECHNIQUES FOR ESTIMATING, MEASURING, MONITORING OR FORECASTING INFORMATION QUALITY, TECHNICAL UNCERTAINTY, ENGINEERING EFFORT AND/OR PRODUCTIVITY

(71) Applicant: Michael W. Grenn, Alexandria, VA (US)

(72) Inventor: Michael W. Grenn, Alexandria, VA (US)

(*) Notice: Subject to any disclaimer, the term of this patent is extended or adjusted under 35 U.S.C. 154(b) by 341 days.

(21) Appl. No.: 14/280,297

(22) Filed: May 16, 2014

(65) Prior Publication Data

US 2014/0344204 A1 Nov. 20, 2014

Related U.S. Application Data

(60) Provisional application No. 61/980,471, filed on Apr. 16, 2014, provisional application No. 61/908,001, filed on Nov. 22, 2013, provisional application No. 61/824,415, filed on May 17, 2013.

(51) Int. Cl.
*G06F 17/00* (2006.01)
*G06Q 10/04* (2012.01)
*G06F 17/50* (2006.01)

(52) U.S. Cl.
CPC ............ *G06Q 10/04* (2013.01); *G06F 17/50* (2013.01)

(58) Field of Classification Search
None
See application file for complete search history.

(56) References Cited

U.S. PATENT DOCUMENTS

| | | | | |
|---|---|---|---|---|
| 2008/0255911 A1* | 10/2008 | Khosla | ............... | G01S 5/0294 705/7.38 |
| 2010/0076714 A1* | 3/2010 | Discenzo | ............... | H02N 2/181 702/104 |
| 2013/0066816 A1* | 3/2013 | Shimomura | ............ | G06N 7/005 706/12 |

OTHER PUBLICATIONS

Selvarani et al. "Software Metrics Evaluation Based on Entropy", 2010, pp. 9, https://books.google.com/books?hl=en&lr=&id=7O30Y57dNXgC&oi=fnd&pg=PA139&dq=Software+Metrics+Evaluation+Based+on+Entropy&ots=AYbbUO9dRd&sig=y67ILJrvjZkBZoSRwaKjAQu6KO0#v=onepage&q=Software%20Metrics%20Evaluation%20Based%20on%20Entropy&f=false.*

* cited by examiner

*Primary Examiner* — Li-Wu Chang
(74) *Attorney, Agent, or Firm* — Haynes and Boone, LLP

(57) ABSTRACT

Embodiments disclosed herein include systems, methods, and apparatuses for managing requirements for an existing or proposed objective system. An information system in accordance with one embodiment includes one or more processors and storage coupled to the one or more processors. The storage is configured to represent requirements data, including one or more requirements for the objective system, and a particular state of the requirements data for the objective system, including subsystems of the objective system. The particular state of the requirements data includes a particular discrete information quality level for each requirement. The processors are programmed to calculate a requirements information entropy metric, $H_R$, for the particular state, and to calculate an additional information increment $\Delta I$. The additional information increment $\Delta I$ represents an amount of additional information necessary to transform the requirements data from the particular state of the requirements data to a desired state of the requirements data.

17 Claims, 18 Drawing Sheets

TECHNIQUES FOR ESTIMATING, MEASURING, MONITORING OR FORECASTING INFORMATION QUALITY, TECHNICAL UNCERTAINTY, ENGINEERING EFFORT AND/OR PRODUCTIVITY

CROSS-REFERENCE TO RELATED APPLICATIONS

The present application claims priority of U.S. Provisional Application No. 61/980,471, filed Apr. 16, 2014; U.S. Provisional Application No. 61/908,001, filed Nov. 22, 2013; and U.S. Provisional Application No. 61/824,415, filed May 17, 2013. The entirety of each of these applications (including appendices) is incorporated herein by reference.

BACKGROUND

Field

The present invention(s) relate generally to techniques for use in a systems or requirements engineering or undertaking, and more particularly, to computational system techniques for estimating, measuring, monitoring and forecasting information quality, technical uncertainty, engineering effort, and/or productivity for or in the course of a technical information development effort.

Background

Systems engineering (SE) is a comprehensive engineering process for identifying, developing and delivering viable system solutions that meet defined need(s) within the specified cost and schedule constraints. The SE process facilitates the documentation of the technical effort and guides the systems engineer and program management team through the activities necessary for engineering specification, design synthesis and system development. The SE process becomes more difficult as systems become more complex and larger in scale. The successful realization of these systems or systems of systems (SoS) requires the integration of numerous activities and processes that support the technical effort and enable its successful completion. SE is the overarching engineering approach for tailoring and integrating the technical effort in order to design and build the right system the right way.

Requirements engineering is among the most important and difficult activities in systems engineering. Requirements engineering includes all the activities involved in the discovery, definition, development, analysis, verification, validation and management of system requirements that drive and bound the system design and engineering effort. System requirements are formal technical statements that describe the functions, capabilities, characteristics and qualities of the system that are necessary to satisfy the customer or user need(s). The system requirements contain the important technical information that communicates what the system must do and how well it must do it. Many problems in the development of complex systems have been traced to poor requirements engineering or poor requirements. Poor requirements often result in system development problems and are often cited as a primary reason why systems engineering and development efforts fail.

Poor requirements have been linked to requirements volatility and requirements volatility has been identified as a major factor contributing to poor program performance. Current requirements metrics supply only a limited portion of the information necessary to identify, isolate, and resolve problems during system development. Requirements volatility problems extend to many hardware and software industries. Requirements evolve over time during the requirements engineering or information development process but all changes are not equal. The engineering effort may not satisfy user needs or may lead to the wrong system being built if requirements quality is ignored. Requirements quality has the largest potential impact on the success of systems developments.

Major Defense Acquisition Programs (MDAPs) in the Department of Defense (DoD) develop complex systems for the U.S. military. MDAPs have struggled in recent years to meet performance objectives within original cost and schedule estimates, particularly when the technology envelope is pushed, requirements are unstable, or system complexity and engineering effort are underestimated. Quality Function Deployment (QFD) has been practiced in the United States for decades; however QFD practitioners in the commercial sector have also struggled with the development of complex systems. Recent studies suggest requirements volatility and underestimation of engineering effort are major contributing factors to the poor outcomes of complex system development programs. The harsh reality is that customers and users must often choose between lower performance, schedule delay or higher cost after significant program resources are expended, resulting in less successful projects, lower customer satisfaction, and erosion of competitive advantage in the marketplace.

In a recent study of 96 different DoD MDAPs, the Government Accounting Office (GAO) found the average cost growth was $3.1 billion, 42 percent of programs had at least a 25 percent unit cost growth, and the average schedule delay in delivering initial operating capabilities was 22 months. Requirements volatility, underestimation of engineering effort and the lack of early systems engineering were identified as contributing factors to poor program performance. As part of the strategy to address these problems, the DoD implemented major changes to its system acquisition practices in order to place greater emphasis on early systems engineering and more rigorous formal reviews of system progress earlier in the development cycle to reduce the negative impact of requirements volatility and the need for costly redesigns later in the system development effort.

A primary objective of requirements engineering is to identify, define, develop, and formulate information that is necessary to design and build a system that satisfies customer or user needs. Requirements engineering is an iterative process and by definition involves changes and transformation of information that describes the system. Implicit in this requirements transformation process is the transition of information from a state of relatively low quality and high technical uncertainty to a state of high quality and low technical uncertainty that enables the right system to be designed and built with confidence. Recently, there has been considerable interest in new leading indicators and methods for estimating, measuring, monitoring and forecasting requirements trends and the impact of requirements volatility because of the importance of requirements engineering in the SE process and the problems that have traced to poor system requirements. Many existing methods for estimating, measuring, monitoring and forecasting requirements volatility and its impact on engineering effort have major limitations because they measure the quantity of requirements changes only without considering information quality or the degree to which changes, revisions, modifications, additions or deletions impact quality relative to a well-defined desired end state. New systems engineering methods are needed to improve the outcomes of complex system development programs, particularly as development schedules compress and legacy systems become obsolete more quickly due to the rapid pace of technology advancement.

SUMMARY

In some embodiments in accordance with the present invention(s), an information system includes one or more processors and storage coupled to the one or more processors. The storage is configured to represent underlying requirements data, which includes one or more requirements for the objective system. The storage is further configured to represent a particular state of the requirements data specified for the objective system, including a plurality of constituent subsystems of the objective system. The particular state of the requirements data specified for the objective system includes a particular discrete information quality level for each requirement in the requirements data represented in the storage. The one or more processors are programmed to calculate, from the particular state of the requirements data and discrete information quality level for each requirement, a requirements information entropy metric, $H_R$, for the particular state, and based on the requirements information entropy metric, to calculate an additional information increment $\Delta I$. The additional information increment $\Delta I$ represents an amount of additional information necessary to transform the requirements data from the particular state of the requirements data to a desired state of the requirements data.

In some embodiments, the one or more processors of the information system are further programmed to calculate a measure of additional engineering effort $\Delta E$, wherein $\Delta E$ represents an amount of system engineering effort required to transition the requirements information entropy metric $H_R$ to a desired state of the underlying requirements data and particular discrete information quality levels for each requirement.

In some embodiments, the one or more processors of the information system are further programmed to calculate a total requirements quality Q, and calculate therefrom, the additional engineering effort $\Delta E$. The cumulative information quality metric Q represents the cumulative quality of the total number of requirements R corresponding to either the current state of requirements data or the desired state.

In some embodiments, the one or more processors of the information system are further programmed to calculate, based on the requirements information entropy metric $H_R$, a forecast of when the desired state will be reached.

In some embodiments, the information system may further include a user interface, implemented on the one or more processors, whereby discrete information quality levels for one or more requirements in the requirement data are modifiable, wherein the modification comprises an updated particular state of the requirements data. The one or more processors of the information system are further programmed to calculate, in correspondence with the modified discrete information quality levels, an updated requirements information entropy metric, $H_R$, corresponding to the updated particular state of the requirements data.

In some embodiments, the one or more processors of the information system are further programmed to calculate, based on the requirements data, a maximum requirements entropy metric $H_{Rmax}$.

In some embodiments, each requirement in the requirements data represented in the storage is characterized by one of fifteen discrete information quality levels.

In some embodiments in accordance with the present invention(s), a computer-implemented method for managing requirements for an existing or proposed objective system includes receiving, by one or more processors, a particular state of underlying requirements data for the objective system. The requirements data includes one or more requirements for the objective system, including a plurality of constituent subsystems of the objective system. The particular state of the underlying requirements data includes a particular discrete information quality level for each requirement for the objective system. The method further includes calculating, by the one or more processors, from the particular state of the underlying requirements data and the particular discrete information quality levels for each requirement for the objective system, a requirements information entropy metric, $H_R$, for the particular state. The method further includes calculating, by the one or more processors and based on the requirements information entropy metric, an additional information increment $\Delta I$, wherein $\Delta I$ represents an amount of additional information necessary to transform the requirements data from the particular state of the requirements data to a desired state of the requirements data.

In some embodiments, the computer-implemented method may further include calculating, by the one or more processors, a measure of additional engineering effort $\Delta E$, wherein $\Delta E$ represents an amount of system engineering effort required to transition the requirements information entropy metric $H_R$ to a desired state of the underlying requirements data and particular discrete information quality levels for each requirement.

In some embodiments, the computer-implemented method may further include calculating, by the one or more processors, a total requirements quality Q, and wherein the additional engineering effort $\Delta E$ is calculated based on the total requirements quality Q. The cumulative information quality metric Q represents the cumulative quality of the total number of requirements R corresponding to either the current state of requirements data or the desired state.

In some embodiments, the computer-implemented method may further include calculating, by the one or more processors, based on the requirements information entropy metric $H_R$, a forecast of when the desired state of the underlying requirements data and particular discrete information quality levels for each requirement will be reached.

In some embodiments, the computer-implemented method may further include providing, by one or more processors, a user interface whereby discrete information quality levels for one or more requirements in the requirement data are modifiable, wherein the modification comprises an updated particular state of the requirements data. The method may further include calculating, by the one or more processors, in correspondence with the modified discrete information quality levels, an updated requirements information entropy metric, $H_R$, corresponding to the updated particular state of the requirements data.

In some embodiments, the computer-implemented method may further include calculating, based on the requirements data, a maximum requirements entropy metric $H_{Rmax}$.

In some embodiments, a non-transitory machine-readable medium comprising a plurality of machine-readable instructions which, when executed by one or more processors, are adapted to cause the one or more processors to perform the computer-implemented method for managing requirements for an existing or proposed objective system.

In some embodiments in accordance with the present invention(s), an apparatus for managing requirements for an existing or proposed objective system includes means for receiving a particular state of underlying requirements data for the objective system. The requirements data includes one or more requirements for the objective system, including a plurality of constituent subsystems of the objective system. The particular state of the underlying requirements data includes a particular discrete information quality level for each requirement for the objective system. The apparatus further includes means for calculating from the particular state of the underlying requirements data and the particular discrete information quality levels for each requirement for the objective system, a requirements information entropy metric, $H_R$, for the particular state. The apparatus further includes means for calculating, based on the requirements information entropy metric, an additional information increment $\Delta I$, wherein $\Delta I$ represents an amount of additional information necessary to transform the requirements data from the particular state of the requirements data to a desired state of the requirements data.

In some embodiments, the apparatus may further include means for calculating a measure of additional engineering effort $\Delta E$, wherein $\Delta E$ represents an amount of system engineering effort required to transition the requirements information entropy metric $H_R$ to a desired state of the underlying requirements data and particular discrete information quality levels for each requirement.

In some embodiments, the apparatus may further include means for calculating a total requirements quality Q, and wherein the additional engineering effort $\Delta E$ is calculated based on the total requirements quality Q. The cumulative information quality metric Q represents the cumulative quality of the total number of requirements R corresponding to either the current state of requirements data or the desired state.

In some embodiments, the apparatus may further include means for calculating, based on the requirements information entropy metric $H_R$, a forecast of when the desired state of the underlying requirements data and particular discrete information quality levels for each requirement will be reached.

In some embodiments, the apparatus may further include means for providing a user interface whereby discrete information quality levels for one or more requirements in the requirement data are modifiable, wherein the modification comprises an updated particular state of the requirements data. The apparatus may further include means for calculating, in correspondence with the modified discrete information quality levels, an updated requirements information entropy metric, $H_R$, corresponding to the updated particular state of the requirements data.

In some embodiments, the apparatus may further include means for calculating, based on the requirements data, a maximum requirements entropy metric $H_{Rmax}$.

Further embodiments, features, and advantages, as well as the structure and operation of the various embodiments are described in detail below with reference to accompanying drawings.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
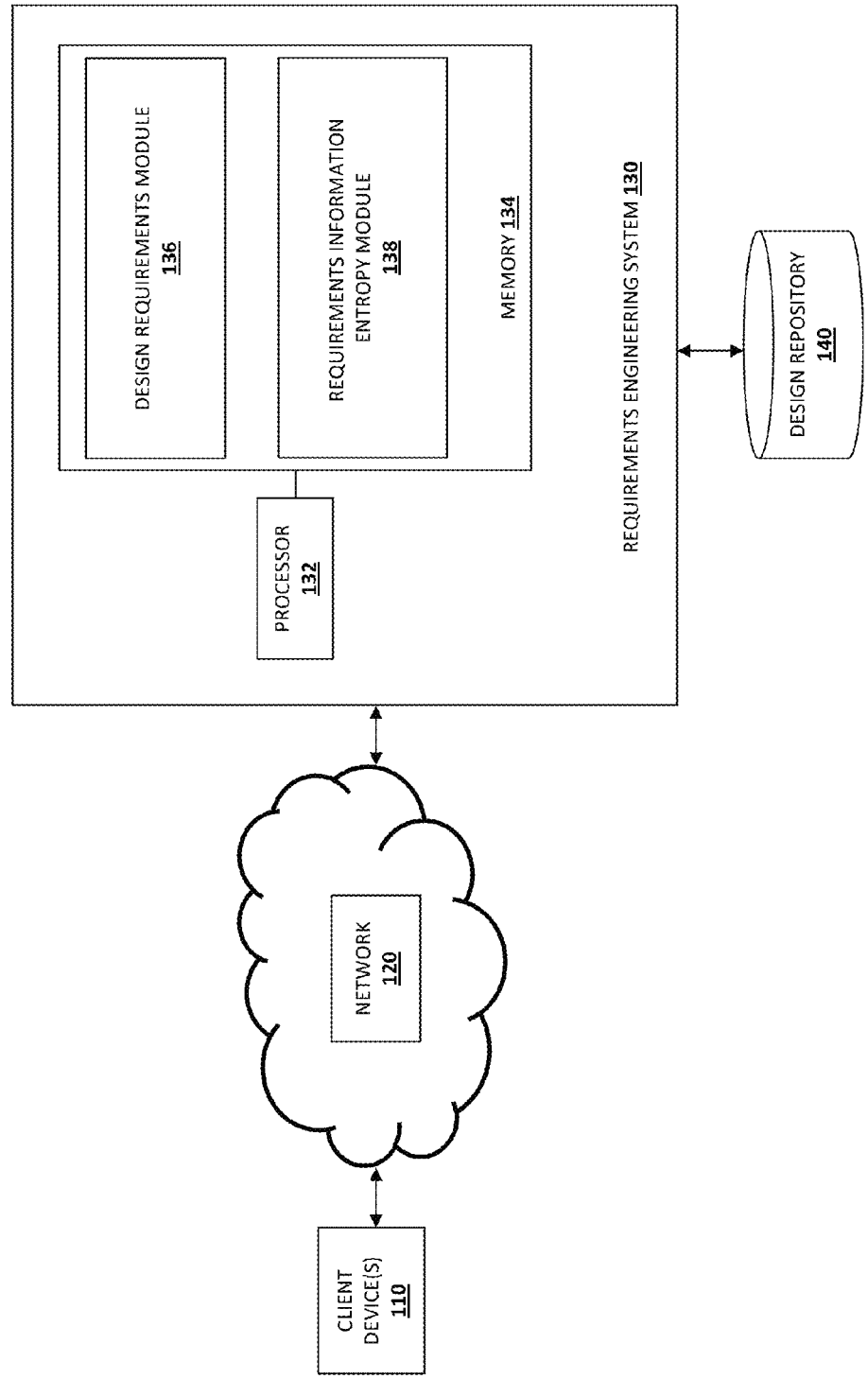
FIG. 1 is an example of a system that may be used to implement one or more embodiments described herein.

In the following description, numerous specific details are set forth. However, it is understood that embodiments of the invention may be practiced without these specific details. In other instances, well-known structures and techniques have not been shown in detail in order not to obscure the understanding of this description.

Embodiments of the present invention disclosed herein relate to an information entropy framework or requirements entropy framework (IEF/REF) method for estimating, measuring, monitoring and forecasting engineering effort with or without information volatility at any time in a requirements engineering or information development process. A rigorous requirements verification and validation effort reduces technical uncertainty and increases confidence that the right system will be built the right way. The number of possible requirements outcomes and therefore the requirements uncertainty increases as the number of requirements R increases, and R increases as the system complexity increases. Improved quantitative methods that can be used by systems engineers, program managers, and contractors to accurately estimate, measure, monitor and forecast the status and progress of the requirements engineering effort is needed in order to improve the outcomes of complex system development programs. Requirements trends are among the most important leading indicators of systems engineering program technical effectiveness and requirements volatility has been suggested as an indicator of good systems engineering practices.

Many existing requirements trend metrics take the form:

$$RV = (r_a + r_r + r_d)/R \quad (1)$$

where $r_a$, $r_r$, and $r_d$ are the number of requirements added, revised (changed, modified) and deleted, respectively, R is the total number of requirements and RV is the total fractional requirements volatility. This metric has major limitations. Specifically, equation (1) simply measures the quantity of changes over time. In effect, equation (1) treats all changes the same because requirements additions, deletions and revisions are weighted equally and summed in the numerator. The relative importance of the changes and their positive or negative effects on requirements quality or information uncertainty are not clearly distinguished. Consequently, the fact that a given change may be good, detrimental or neutral to systems development is not taken into account. For example, revisions to system requirements that reduce technical uncertainty, increase quality, make the requirements more realistic given the current state of technology maturity, specify performance levels more accurately, resolve technical inconsistencies or enable a complex military system to be delivered on schedule are treated the same as other changes or new requirements that have the opposite effect. A single revision can impact numerous other requirements and result in negative ripple effects that are not captured by equation (1) in the corresponding measurement interval. The metric defined by equation (1) combined with linear extrapolation to forecast when the requirements will reach zero fractional volatility will be referred to herein as the Fractional Method.

Entropy expresses the degree of uncertainty, randomness and disorder. The meaning of information is not important in many engineering problems. For example, communication theory is concerned with the reproduction of encoded information transmitted from a source to a destination through a channel with or without noise. The entropy in information theory describes this uncertainty. Systems engineering is concerned with the meaning of information contained in the system requirements and the productivity of the requirements engineering processes used to discover, identify, define, develop, formulate, analyze, trace, qualify, verify, validate, document, interpret, and manage the information necessary for successful system design and development.

The meaning of information is important in the systems engineering problem because the system requirements specify what the system must do and how well it must do it in order to meet the customer or user needs. The information documented and contained in the system requirements is the source information that drives and bounds the system design and development effort, and the meaning of this technical information must be understood by the system engineering team. Otherwise, there is risk that the wrong system will be built or the system will fail to provide an important capability or function. Quality attributes can be defined to verify and validate the system requirements. The quality attributes reflect the meaning of the requirements information and its fitness for resolving the systems engineering problem.

The relationship between entropy, information and energy is well documented, and this relationship is central to information theory and statistical mechanics. The number of possible microstates, or the number of possibilities, that comprise physical systems can be astronomical, and statistical mechanics describes the relationship between the observed macroscopic behavior and the number of possible microstates corresponding to that behavior. As the number of possibilities decrease, information and certainty increase. Embodiments of the invention describe practical systems, methods, and apparatuses for estimating, measuring, monitoring, and forecasting information quality, technical uncertainty (e.g. requirements entropy), engineering effort, and productivity using a framework that defines their relationship and accounts for the additional information that is necessary to design and develop a successful system.

A major premise of the IEF/REF of the embodiments disclosed herein is that requirements changes can be good, bad or neutral depending on the degree to which additions, revisions and deletions have a positive or negative impact on the requirements quality, entropy and uncertainty. The IEF/REF of the embodiments disclosed herein defines and assesses the relationship between requirements quality, entropy, uncertainty and the engineering effort necessary to improve the information from its current state to the desired state. The concept of entropy (as summarized above) was extended herein to define a new measure of the meaning of information as reflected by its quality, which is determined by quality attributes defined to be important in the given context. The IEF/REF enables the estimation, measurement and forecasting of information quality, entropy and uncertainty that is independent of the means used to generate it.

As the requirements or information statements undergo the transformation from poor quality to higher quality, the number of possible distributions (or microstates) available to them in the IEF/REF also decreases. The number of possible poor quality requirements for a given system is much greater than the number of possible high quality requirements. Disordered states are more probable than ordered ones and the entropy of the state of a set of requirements or information statements is a measure of its probability of occurrence. States of low probability have low entropy and states of high probability have high entropy. For example, it is much more likely to write poor quality requirements and there are many more possible wrong requirements than right ones. Poor quality requirements have high entropy because their probability of occurrence is high and high quality requirements have low entropy because their probability of occurrence is low.

Embodiments of the present invention relate to a method for estimating, measuring, monitoring and forecasting engineering effort or information development effort with or without negative effects of information volatility at any time in a requirements engineering or information development process using an IEF/REF. The method involves supplying an IEF/REF with discrete levels corresponding to the cumulative quality of requirements or information statements for estimation, measurement, monitoring and forecasting of trends during the requirements engineering or information development process and engineering or information development effort necessary to transition the requirements or information statements from their current quality distribution among the defined levels to the desired end state or other interim state of quality. The requirements or information statements are assigned to an information quality level corresponding to the number of quality attributes that apply at any given time in the process, resulting in a distribution of requirements or information statements among the levels. Conceptually, the requirements or information statements transition from a distribution that represents their current state of quality, entropy, disorder or uncertainty to distributions representing the degree to which their quality, entropy, disorder or uncertainty increases or decreases during the process as more or less quality attributes apply to the requirements or information statements over time.

The goal of the requirements engineering or information development effort is to define the objective system as efficiently as possible, using a set of good requirements containing information about what the objective system needs to do and how well it needs to do those things, in order to satisfy a customer. Thus, increasing requirements or information statement quality may be part of the requirements engineering process. Unpredictable changes in requirements or information during the requirements engineering process may result in negative volatility effects that decrease quality and increase entropy, disorder or uncertainty, which increases the additional engineering or information development effort needed to transition the requirements or information statements from their current state to the desired end state.

The number of requirements or information statements R may occupy any of the N discrete levels corresponding to the number of quality attributes that apply to each of them at any given time. Quantum statistics are used to estimate the number of possible microstates P available to R. The requirements entropy $H_R$ decreases as the quality of requirements or information statements increase. The information I increases as $H_R$ decreases, and $\Delta I$ is the additional information needed to reduce the $H_R$ from its current state to the desired state. The $H_R$ may increase, decrease or remain steady depending on the degree to which additions, deletions and revisions impact the distribution of R among the quality levels.

Current requirements volatility metrics such as the Fractional Method generally treat additions, deletions and revisions the same and measure the quantity of these changes over time. The IEF/REF embodiments described herein measure the quantity of requirements changes over time, estimate the impact of these changes on $H_R$ and $\Delta I$, and forecast when the desired state will be reached, effectively quantifying the status and progress of the requirements engineering effort at any point in the process. Random variable simulations demonstrate that the IEF/REF can provide significantly different results than the Fractional Method and is an improved leading indicator of requirements trends that can be readily combined with current methods because the IEF/REF accounts for requirements or information quality and the impact of changes on quality and entropy, disorder or uncertainty.

Generally, the cumulative requirements or information statement quality Q is proportional to the input of engineering effort (which may also include information development effort) E. Simulation results show that the IEF/REF agrees with measured engineering effort data published in the open literature for Department of Defense (DoD) programs and is a useful method or estimating, measuring, monitoring or forecasting the $\Delta E$ needed to transition the requirements or information statements from their current state to the desired end state or some other improved interim state of interest.

FIG. 1 is an example of a system 100 that may be used to implement one or more embodiments described herein. System 100 includes one or more user devices 110 that are coupled to a network 120. System 100 further includes requirements engineering system 130, coupled to or connected to design repository 140.

The client devices 110 may be implemented using any appropriate combination of hardware and/or software configured for wired and/or wireless communication over network 120. For example, in one embodiment, the client devices 110 may be implemented as a personal computer of a user in communication with the Internet. In other embodiments, the client devices 110 may be a smart phone, laptop computer, wearable computing device, and/or other types of computing devices.

The network 120 may be implemented as a single network or a combination of multiple networks. For example, in various embodiments, the network 120 may include the Internet and/or one or more intranets, landline networks, local area networks, wide area networks, wireless networks, and/or other appropriate types of networks.

Requirements engineering system 130 may include one or more processors 132 and memory 134. In accordance with one or more embodiments, requirements engineering system 130 may perform specific operations by the processor 132 executing one or more sequences of instructions contained in the memory component 134. Such instructions may be read into the memory component 134 from another computer readable medium, such as a static storage component or a disk drive component. In other embodiments, hardwired circuitry may be used in place of or in combination with software instructions to implement the present disclosure.

Memory 134 may store sequences of instructions or software, such as system requirements (e.g. design) module 136 and requirements entropy module 138. Design requirements module 136 may provide, in one embodiment, a user interface that facilitates the receipt, modification, processing, and other actions related to requirements data and associated quality level information, as described herein. Design requirements module 136, in one embodiment, interacts with design repository 140 to add, delete, modify, or perform other actions related to requirements data. Moreover, design requirements module 136 may facilitate the interaction between a client device 110 and requirements engineering system 130.

Requirements information entropy module 138 may process requirements data and associated quality level information to provide a requirements information entropy metric or other information of interest, as described further herein. Requirements information entropy module 138 may receive or retrieve requirements data from a design repository 140. Design repository 140, in one embodiment, may be a relational or non-relational database which stores requirements and associated information.

Figure 2:
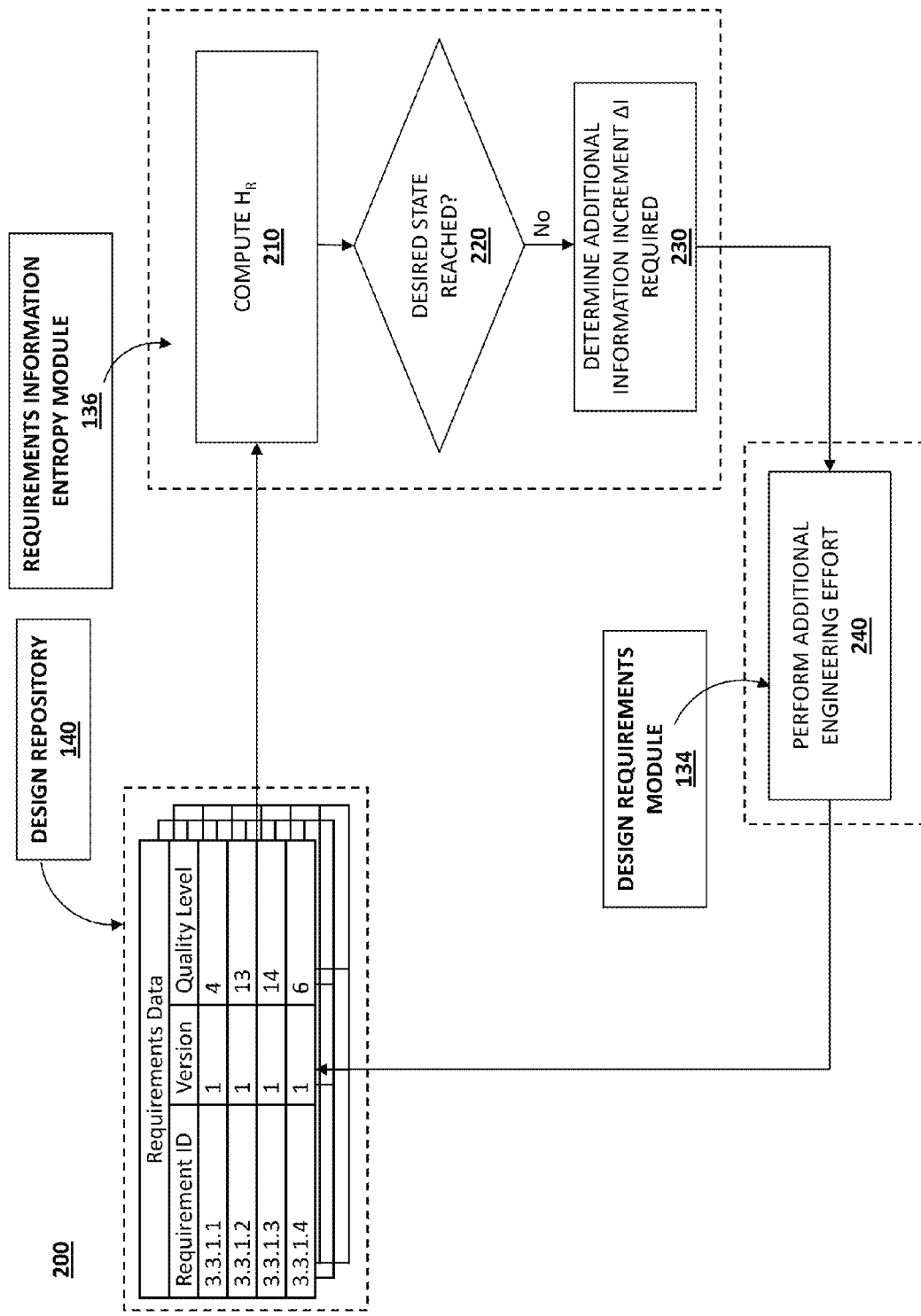
FIG. 2 is an example scenario described with reference to one or more embodiments described herein.

FIG. 2 is an example scenario described with reference to one or more embodiments described herein. FIG. 2 depicts design repository 140 and the contents of design repository 140, which may include, in one embodiment, one or more database tables storing requirements data.

In systems engineering, requirements may be statements which communicate information needed to achieve specific operational capabilities and system objectives. The requirements engineering effort often documents many types of requirements, e.g., functional, performance, interface, user, design, reliability, maintainability, and other requirements. These requirements are documented in order to describe the system in sufficient detail for the system's successful design, implementation, and integration.

Thus, in the example of a system which requires a communications subsystem, the requirements for the communications subsystem may be described as follows in the form of an outline or hierarchy:

3. System Requirements 3.1 Required States and Modes of Operation

. . . .

3.2 Functional Requirements 3.2.1 Communication Subsystem 3.2.1.1 TBD

. . . .

3.2.1.n TBD 3.3 Performance Requirements 3.3.1 Thermal Imaging Subsystem (TIS)

3.3.1.1 The TIS shall incorporate multiple cooled 640×480 element long wavelength infraredfocal plane arrays with a TBD field of view.

3.3.1.2 The TIS shall enable a trained operator to identify a T-72 tank at a minimum range of 10 kilometers in less than 5 seconds under all conditions specified in Appendix A.

3.3.1.3 The total weight of the TIS shall not exceed 5 pounds.

3.3.1.4 The TIS shall display analog and digital video using an internal display having a minimum horizontal field of view to the eye of 39 degrees.

. . . .

In the preceding example, the functional requirements of the communication subsystem in section 3.2.1 have not yet been written. Thus, those n number of communication subsystem functional requirements would occupy the $q_0$ discrete information quality level (i.e., the lowest state) because these requirements do not yet have any quality attributes. The following table illustrates a generic example that summarizes the requirements metadata documentation and quality assessment for each example thermal imaging system performance requirement listed in section 3.3.1 above.

| | |
|---|---|
| Requirement ID | 3.3.1.1 |
| Version | 1 |
| Source/Owner | J. Smith |
| Annotation | No |
| Traced to/from | Incomplete |
| Verification | Yes; method, lead, level specified |
| Validation | No |
| Quality Level | 4 |
| Quality Attributes | Understandable, Concise, Verifiable, Not Redundant |
| Comment | "multiple" is ambiguous; "cooled 640 × 480" design dependent; TBD is incomplete; not annotated, traced, validated; realistic, precise consistent, correct are uncertain. |
| Requirement ID | 3.3.1.2 |
| Version | 1 |
| Source/Owner | J. Smith |
| Annotation | Yes |
| Traced to/from | Yes |
| Verification | Yes; method, lead, level specified |
| Validation | Yes |
| Quality Level | 13 |
| Quality Attributes | Correct, Precise, Understandable, Complete, Validated, Verifiable, Traced, Unambiguous, Consistent, Concise, Design Independent, Annotated, Not Redundant |
| Comment | "trained", "identify" task, and operational conditions defined in Appendix A; realistic is uncertain given time constraint of 5 seconds for identify task. |
| Requirement ID | 3.3.1.3 |
| Version | 1 |
| Source/Owner | M. Jones |
| Annotation | Yes |
| Traced to/from | Yes |
| Verification | Yes; method, lead, level specified |
| Validation | Yes |
| Quality Level | 14 |
| Quality Attributes | All |
| Comment | |
| Requirement ID | 3.3.1.4 |
| Version | 1 |
| Source/Owner | D. Johnson |
| Annotation | No |
| Traced to/from | Yes |
| Verification | No |
| Validation | No |
| Quality Level | 6 |
| Quality Attributes | Correct, Complete, Understandable, Traced, Concise, Not Redundant |

-continued

| | |
|---|---|
| Comment | An internal display is needed but rationale for both analog and digital display is not provided; need for 39 degrees HFOV is unclear; ambiguous; precise, consistent, realistic uncertain; verification method not defined; not validated; internal display may constrain design. |

In FIG. 2, requirements data is represented as stored in a single row in a relational database table. For example, each of the Requirement ID, Version, Source/Owner, Annotation, Traced to/from, Verification, Validation, Quality Level, Quality Attributes, and Comment fields may be a column for each row of the relational database table. A description of the requirement may also be included. The requirements data shown in the example of FIG. 2 includes the requirement ID, version, and quality level information, but other information may be included as well. Moreover, embodiments described herein may use database structures other than a relational database storing requirement data in a single table. For example, identifiers and descriptions may be stored in one table, while another table stores requirement identifiers with their associated quality levels.

Data from design repository 140 is processed by requirements information entropy module 138 to compute requirements information entropy metric $H_R$ as will be further described below. Requirements information entropy module may use this calculated requirements information entropy metric $H_R$ to determine whether a desired state for the requirements information entropy metric has been reached. The desired state may also be stored in design repository 140, in one embodiment. If requirements information entropy module 138 determines that the requirements information entropy metric has not reached the desired state, requirements information entropy module 138 may further process data from design repository 140 to determine an additional information increment ΔI to determine an additional information increment needed to transition the requirements information entropy metric to the desired state, as will be further described below. Once the additional information increment ΔI is calculated, additional engineering effort may be performed. In one embodiment, design requirements module 134 is used to modify quality levels for requirements and store such data in design repository 140. The process may then repeat until the desired state is reached.

Figure 3:
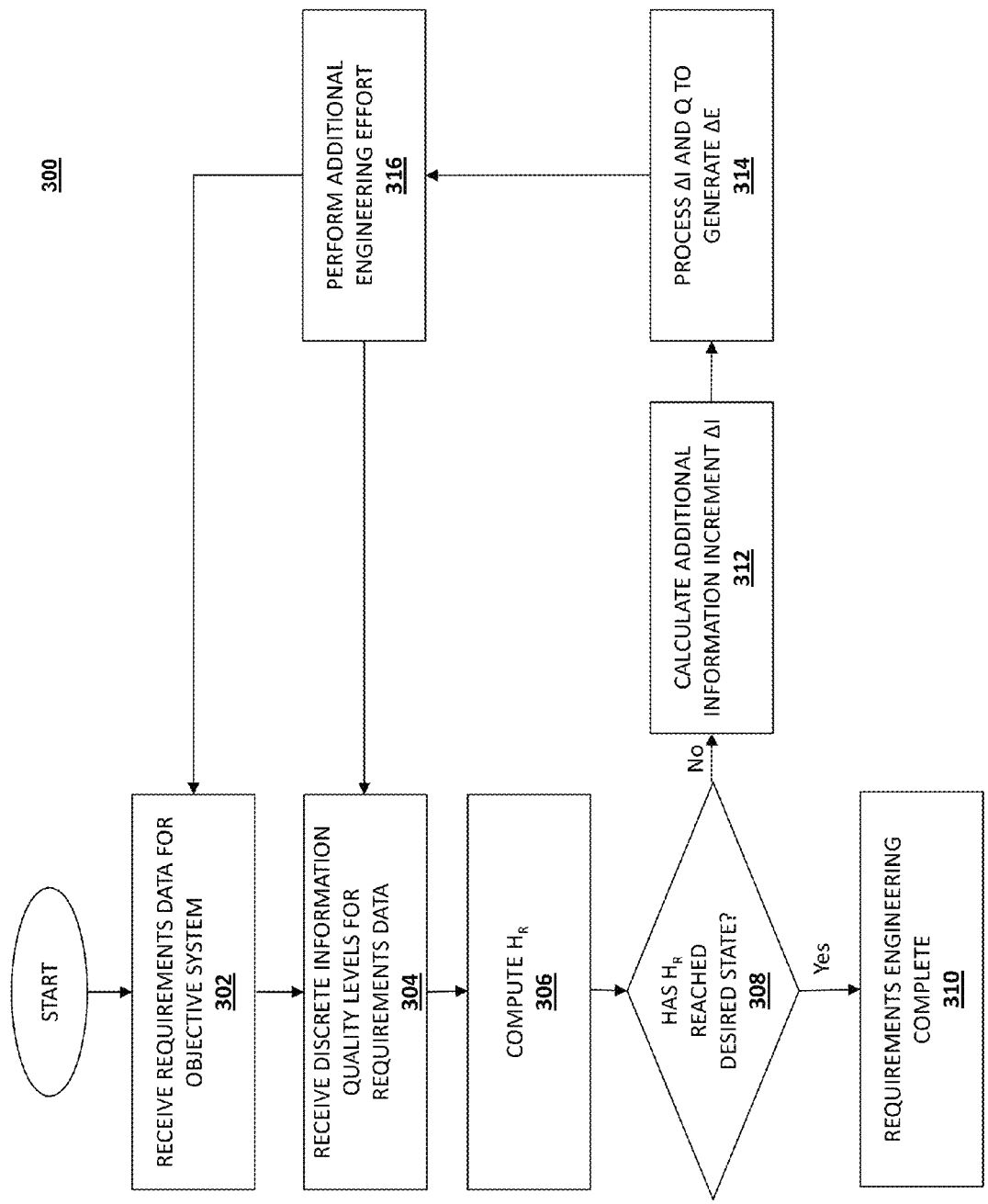
FIG. 3 is a flow diagram of a method describing an example operation of one embodiment.

FIG. 3 is a flow diagram of a method 300 describing an example operation of one embodiment in further detail. Method 300 begins at step 302, where requirement data for an existing or proposed objective system is received. The requirement data may be received by, in one embodiment, requirements engineering system 130 coupled to or connected to design repository 140. Requirement data may be received from a client device 110 over network 120. User 110 may input or otherwise provide requirements data over network 120 using a design requirements module 136 executed by and provided by processor 132 of requirements engineering system 130.

The existing or proposed objective system may be any system that requires a systems engineering process. For example, in the defense space, a new satellite launching system may be a proposed objective system that would benefit from a systems engineering process. Similarly, a revised satellite launching system may be an existing objective system to which the systems engineering process described herein may be applied. The requirement data includes a plurality of requirements for the objective system. For example, the objective system may have a certain size as a requirement, a list of required functionality, reliability requirements, and any other requirements typical for the objective system. In certain objective systems, a portion of the requirements may be reused in the objective system based on their use in other previous systems, while another portion of the requirements may be newly developed for the objective system. Thus, at step 302, requirement data is received, which may also include determining the number of requirements necessary to design or build a successful system or the number of information statements necessary for a knowledgeable recipient of the information to understand the meaning of the information.

At step 304, quality attributes, or more specifically, a discrete information quality level, for each requirement in the requirement data, are received. In one example, each requirement in the requirement data may be associated with, or occupy, one discrete information quality level corresponding to the requirement's cumulative quality at a given time. In one example, fourteen information quality levels may be used, plus an additional state representing a zero information quality level. Information quality levels used in one embodiment are described and listed in Table I. However, such examples are not limiting; any number of information quality levels may be used in the embodiments described herein. For example, the number of information quality levels may be dependent on the attributes important for the requirements quality of the given objective system.

The set of discrete information quality levels for each requirement may be considered a particular state of the requirements data. Thus, in the particular state of the requirements data, each requirement has an associated discrete information quality level. In one embodiment, the discrete information quality levels may be received from client device 110 over network 120 and stored in design repository 140. For example, a user of client device 110 may input or otherwise provide discrete information quality levels over network 120 using a user interface provided by design requirements module 136 executed by and provided by processor 132 of requirements engineering system 130. Design repository 140 may store the requirements and associated discrete information quality levels in a table; for example, each row in a database table may represent a requirement and its discrete information quality level. The discrete information quality levels for each requirement may be dependent on many factors. For example, requirements that are reused may have a higher initial discrete information quality level, because those requirements have been previously subject to systems engineering. Correspondingly, requirements that are new for the given objective system may have a lower initial discrete information quality level, because those requirements have not been subject to systems engineering. The attributes which are necessary or important for requirements quality or the meaning of information may be received at step 304, along with the number of levels corresponding to the number of attributes and the number of attributes that apply to each requirement. In one embodiment, step 304 may also include determining a requirements distribution among the various levels, and determining the number of possibilities available to the requirements given their current distribution, as will be described further. Method 300 then proceeds to step 306.

At step 306, a requirements information entropy metric $H_R$ is calculated from the requirements data and the qualitylevels corresponding to each requirement. In one embodiment, the requirements entropy metric is calculated according to the following equation:

$$H_R = -r_0 \log_2 \frac{r_0}{RP_0} - \ldots - r_{14} \log_2 \frac{r_{14}}{RP_{14}} = -\sum_{n=0}^{14} r_n \log_2 \frac{r_n}{RP_n}$$

In the above equation, each r represents an individual requirement n, while P represents the number of possibilities for r. The number of possibilities for a given r may be approximated by the following equations:

$$P_{SA} = e^{[\sum_{n=0}^{14} (r_n+N-1)ln(r_n+N-1)-(N-1)ln(N-1)-r_n ln r_n]}$$

or $$P_{BE} = \frac{(R+N-1)!}{R!(N-1)!}$$

The requirements information entropy metric $H_R$ may be calculated, in one embodiment, by processor 132 executing instructions stored in memory 134 as requirements information entropy module 138. In one embodiment, requirements information entropy module 138 and design requirements module 136 may present a user of client device 110 with the calculated requirements information entropy metric $H_R$. In some embodiments, the computation to provide the requirements information entropy metric $H_R$ may be performed in a manner that will be appreciated by persons of ordinary skill in the art based on the following pseudocode:

```
Set SUM(H_Rn)=0
R=SUM(requirements)
N_max=SUM(quality attributes)+1
N_a=number of available quality levels
Q=SUM(r_n q_n)
P=SUM(e (r_n+N_a-1)ln(r_n+N_a-1)-(N_a-1)ln(N_a-1)-r_n ln r_n)
FOR ∀ r ∈ R
    IF R known
        IF r_n known
            H_Rn = r_n log_2(r_n/P_n R)
        THEN H_R = -SUM(H_Rn)
        ELSE R = R̂
            r_n = r_n
            H_Rn = r_n log_2(r_n/P_n R)
        THEN H_R = -SUM(H_Rn)
END
Save H_R
```

In the above pseudocode example, the number of possibilities P is calculated according to the Sterling approximation $P_{SA}$. Once the requirements information entropy metric $H_R$ is calculated at step 306, method 300 proceeds to decision step 308.

At decision step 308, a determination is made as to whether the requirements entropy metric has reached a desired state. For example, the desired state may be a requirement entropy metric value of zero, representing that all requirements have achieved their maximum requirements quality. Thus, in the case of fourteen quality levels, each requirement occupies quality level 14 at the desired state. In another example, the desired state may be a desired requirement entropy metric value that is non-zero, but which represents a stable state. In one embodiment, the determination at decision step 308 is performed by requirements information entropy module 138. In one embodiment, the desired state may be input previously by a user of client device 110 over network 120, using a user interface provided by design requirements module 136 and stored in design repository 140.

If, at decision step 308, the requirements information entropy metric $H_R$ has reached a desired state, method 300 proceeds to step 310, and the requirements engineering process may be complete.

If the requirements information entropy metric $H_R$ has not reached a desired state at decision step 308, an additional information increment measure $\Delta I$ may be calculated at step 312. The additional information increment measure $\Delta I$ may be calculated based on the following equation:

$$\Delta I = H_R - H_{Rmin}$$

In the above equation, $H_R$ is the requirements information entropy metric calculated at step 306, and $H_{Rmin}$ is the desired end state for the requirements engineering process (whether a zero value or non-zero). The additional information increment measure $\Delta I$ may be a value in bits of the increase in requirements information necessary for the requirements R to reach the desired state. The additional information increment measure $\Delta I$ may be calculated by requirements information entropy module 138, and may be presented to a user of client device 110 using a user interface provided by design requirements module 136. In one embodiment, the additional information increment measure $\Delta I$ may be used to forecast when the desired state will be reached. In some embodiments, the computation to provide the additional information increment measure $\Delta I$ may be performed in a manner that will be appreciated by persons of ordinary skill in the art based on the following pseudocode:

```
Set I=0
Set ΔI= 0
R=SUM(requirements)
FOR maximum requirements information entropy
    N=N_max
    P=(R+N-1)!/(R!(N-1)!)
    H_Rmax=R log_2 P
    I= H_Rmax- H_R
END
ΔI= H_R- H_Rmin
Save ΔI
```

Method 300 may then proceed to step 314. At step 314, an additional requirements engineering effort $\Delta E$ may be generated, based on the additional information increment measure $\Delta I$ and a total requirements quality Q. The total requirements quality Q may be defined by the following equation:

$$Q = \sum_{n=0}^{14} r_n q_n = r_0 q_0 + r_1 q_1 + \ldots + r_{14} q_{14}$$

The cumulative information quality metric Q represents the cumulative quality of the total number of requirements R corresponding to either the current state of requirements data or the desired state. In some embodiments, the computation to provide the total requirements quality Q may be performed in a manner that will be appreciated by persons of ordinary skill in the art based on the following pseudocode:

```
Set SUM(r_n q_n)=0
N=SUM(quality attributes)+1
```

```
N_max=SUM(quality attributes)+1=q_max
FOR ∀ r ∈ R
    Q=SUM(r_n q_n)
END
Save Q
```

Thus, ΔI and Q may be used to generate the additional requirements engineering effort ΔE according to the following equation:

$$\Delta E \overset{def}{=} \Delta IQ/\langle b \rangle$$

As above, ΔI in bits is the increase in requirements information necessary for the requirements R to reach the desired state. The <b> represents the average information output rate for ΔI in bits per unit time, and may be used as a metric for the productivity of the engineering effort. In one embodiment, the additional requirements engineering effort ΔE is calculated only when engineering effort estimation is of interest to parties engaged in the systems engineering process. The additional engineering effort increment ΔE represents an amount of additional engineering effort necessary to transform the requirements data from their current distribution among the quality levels to the desired state of information quality. In some embodiments, the computation to provide the additional engineering effort ΔE may be performed in a manner that will be appreciated by persons of ordinary skill in the art based on the following pseudo-code:

```
Set ΔE=0
N_max=SUM(quality attributes)+1=q_max
Q_max=Rq_max
⟨b⟩ =average information output rate in bits/second
ΔE= (ΔIQ_max)/⟨b⟩
Save ΔE
```

Once the additional requirements engineering effort ΔE is calculated, method 300 may proceed to step 316. At step 316, additional engineering effort is performed. Thus, requirements may move to occupy different information quality levels (e.g., a particular requirement may move to from information quality level q2 to q3) given the additional engineering effort. The additional engineering effort may result in an updated particular state of the requirements data. That is, in the updated state, one or more requirements have a new or updated discrete information quality level. Moreover, changes or new requirements may impact the updated particular state of the requirements data. The impact of such changes may be determined by estimating, measuring, or monitoring the requirements distribution, number of possibilities, entropy, or other information.

Once the additional engineering effort is performed at step 316, method 300 may return to step 304, where the updated information quality attributes for the requirements are received. Updated information quality attributes for the requirements may be received by, in one embodiment, design requirements module 136 using a user interface, and such updated information quality attributes may be stored in design repository 140. In one embodiment, method 300 may return to step 302, where additional requirements data for the objective system is received, and information quality attributes for the requirements may then be received in accordance with step 304. Step 306 may then be repeated, and an updated requirements entropy metric corresponding to the updated particular state of the requirements data may be calculated. Method 300 then proceeds as described above to step 308, where the requirements entropy metric may be determined to have reached a desired state. As described above, if at step 308, the updated requirements entropy metric has reached the desired state, method 300 may proceed to step 310, and the systems engineering process may be complete. Alternatively, method 300 may proceed to step 312 as described above, and the process may iterate until the requirements entropy metric reaches the desired state.

Figure 4:
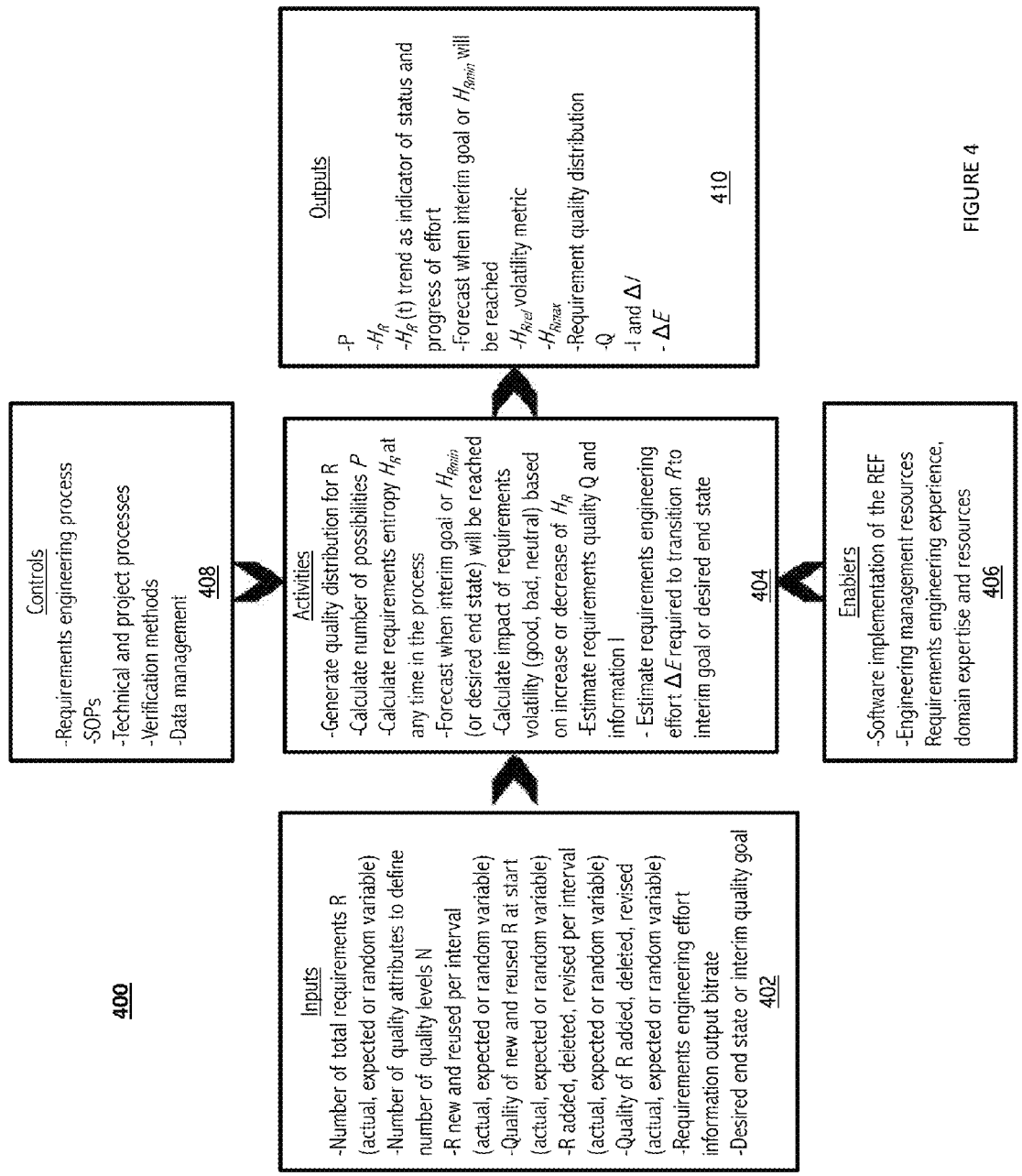
FIG. 4 shows a context diagram of the modeling process of the present invention.

FIG. 4 shows a context diagram 400 of the modeling process of embodiments disclosed herein. As shown in FIG. 4, the IEF/REF described with reference to the embodiments disclosed herein may include a number of input parameters 402, activities 404, enablers 406, controls 408, and outputs 410. The input parameters 402 for the IEF/REF can be manually entered based on measured or expected values or estimated by random variable simulations using probability distributions that approximate the observed or expected behavior. For example, the number of requirements R can be manually entered if known at a given time in the program. If the IEF/REF is being used for the purpose of forecasting or predicting, then the expected R can be entered. The R can also be estimated in the IEF/REF using a random variable with or without an estimated mean or standard deviation. The deleted requirements or information can be handled similarly. The number of revisions or new requirements added per unit time or interval can also be measured or estimated. These input parameters 402 may be entered using, for example, a user interface provided by design requirements module 136 implemented by processor 132 of requirements engineering system 130.

Inputs 402 may include, for example and without limitation, the number of requirements R, the number of quality attributes to define the number of discrete information quality attributes, the desired end state, and other such inputs. Such inputs may be received as described above with reference to steps 302, 304, and 316. The activities 404 may include, as one example, calculating the requirements information entropy metric $H_R$ at a given time in the requirements engineering process, such as at step 306. Enablers 406 may include, in one example, the design requirements module 136 and requirements information entropy module 138 stored in memory 134 and executed by processor 132 of requirements engineering system 130. Controls 408 may be specific to the objective system to which requirements engineering effort is applied, such as verification methods and desired data management techniques. Outputs 410 may include, for example, a forecast of when the desired end state will be reached, or the current requirements entropy metric $H_R$.

Figure 5:
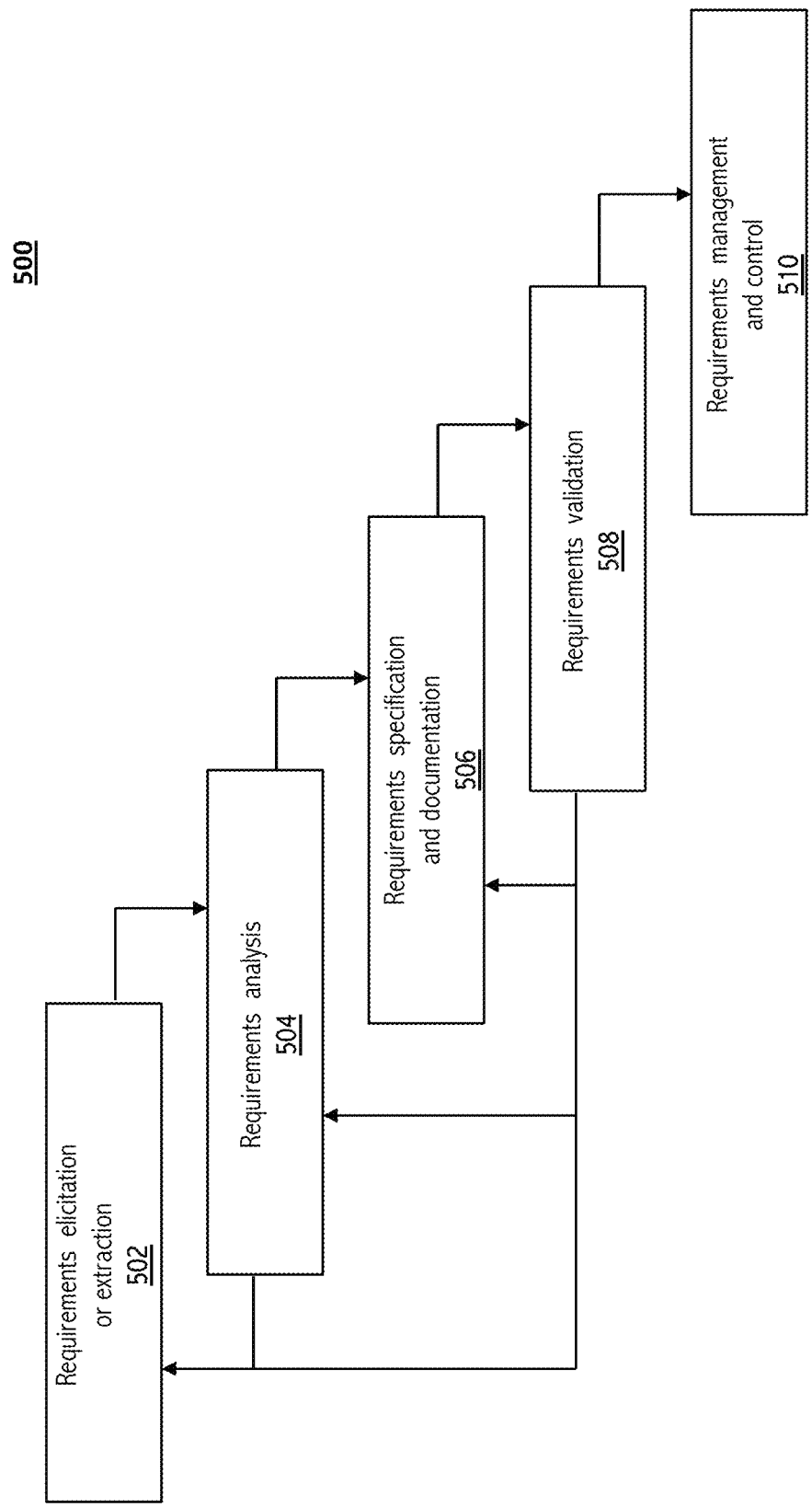
FIG. 5 shows an example of the activities or steps in the requirements engineering process during which embodiments disclosed herein may be employed to determine the status and progress of the requirements engineering process.

FIG. 5 is an example of the activities or steps in the requirements engineering process during which certain embodiments, such as the embodiments described with reference to FIGS. 2 and 3, may be utilized. Such embodiments implementing the IEF/REF would be a useful method for determining the status and progress of the requirements engineering effort, measuring and monitoring requirements trends, forecasting when the requirements will reach the desired end state, and estimating the engineering effort necessary for a given requirements engineering process to transform the requirements from their current state to the desired end state. The activities or steps in the requirements engineering processes may be depicted in many ways using a variety of process flow models (e.g. waterfall, spiral, course-grain, etc.). The IEF/REF is applicable to all requirements engineering processes, independent of their representation or description.

For example, FIG. 5 includes the activity of requirements elicitation or extraction 502. Requirements elicitation or extraction 502 may be performed during the receipt of requirement data, as explained above with reference to step 302 of method 300. Further, FIG. 5 includes the activity of requirements analysis 504, which may be performed during the initial receipt of requirement data as explained with reference to step 302, and also may be performed during the receipt of quality attributes and discrete quality information levels for each requirement as explained with reference to step 304.

FIG. 5 further includes the activity of requirements specification and documentation 506, which may also be performed during the receipt of requirement data in step 302 and during the receipt of quality attributes with reference to step 304. Moreover, requirements specification and documentation activities 306 may include the performance of additional engineering effort, as described above with reference to step 316, which may result in one or more requirements occupying different discrete quality information levels. The activity of requirements validation 308 also may result in one or more requirements occupying different discrete quality information levels, which may eventually result in the requirements entropy metric $H_R$ arriving at the desired state. As shown in FIG. 5, activities 502, 504, 506, and 508 may be performed multiple times, such that the requirements engineering process is an iterative process that eventually results in the requirements entropy metric $H_R$ arriving at the desired state, as described above with reference to method 300. Once the requirements entropy metric $H_R$ arrives at the desired state, the activity of requirements management and control 510 may be performed.

Figure 6:
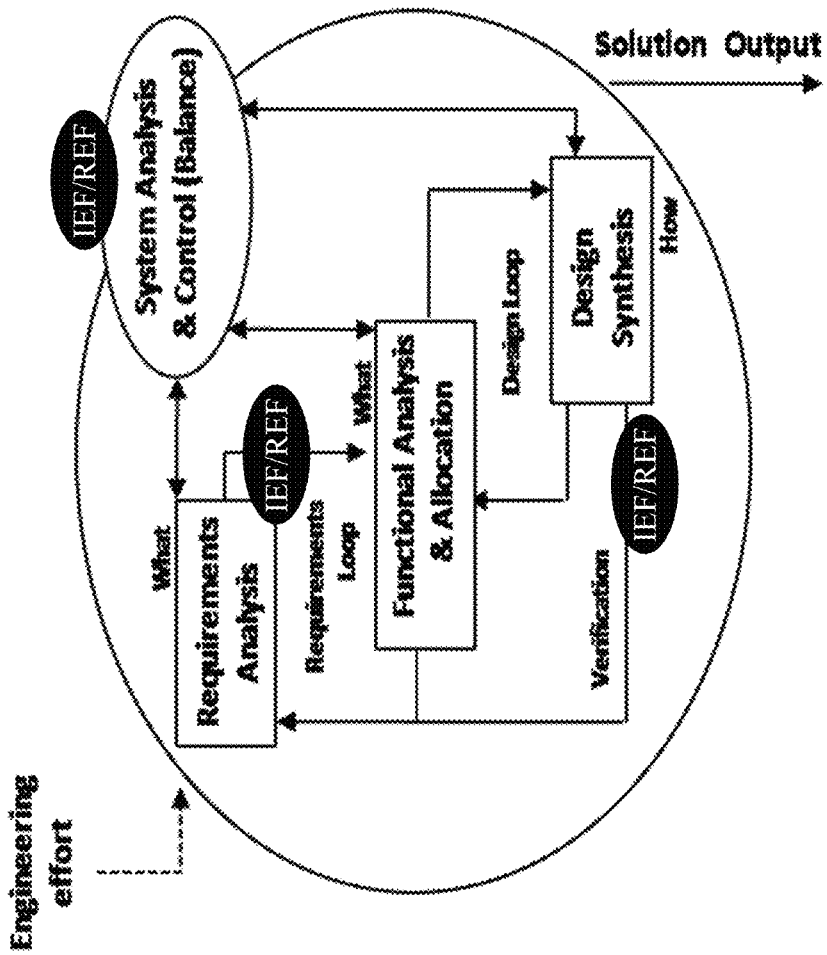
FIG. 6 shows an example of the requirements entropy framework (REF) engineering process flow in the context of a systems engineering process.

FIG. 6 is an example of the requirements engineering process flow in the context of the systems engineering process. The example of FIG. 6 depicts the importance of the requirements engineering process early in the systems engineering effort. Further, as shown in FIG. 6, the IEF/REF as described with reference to the embodiments described herein may be used at multiple points during the systems engineering process.

Figure 7:
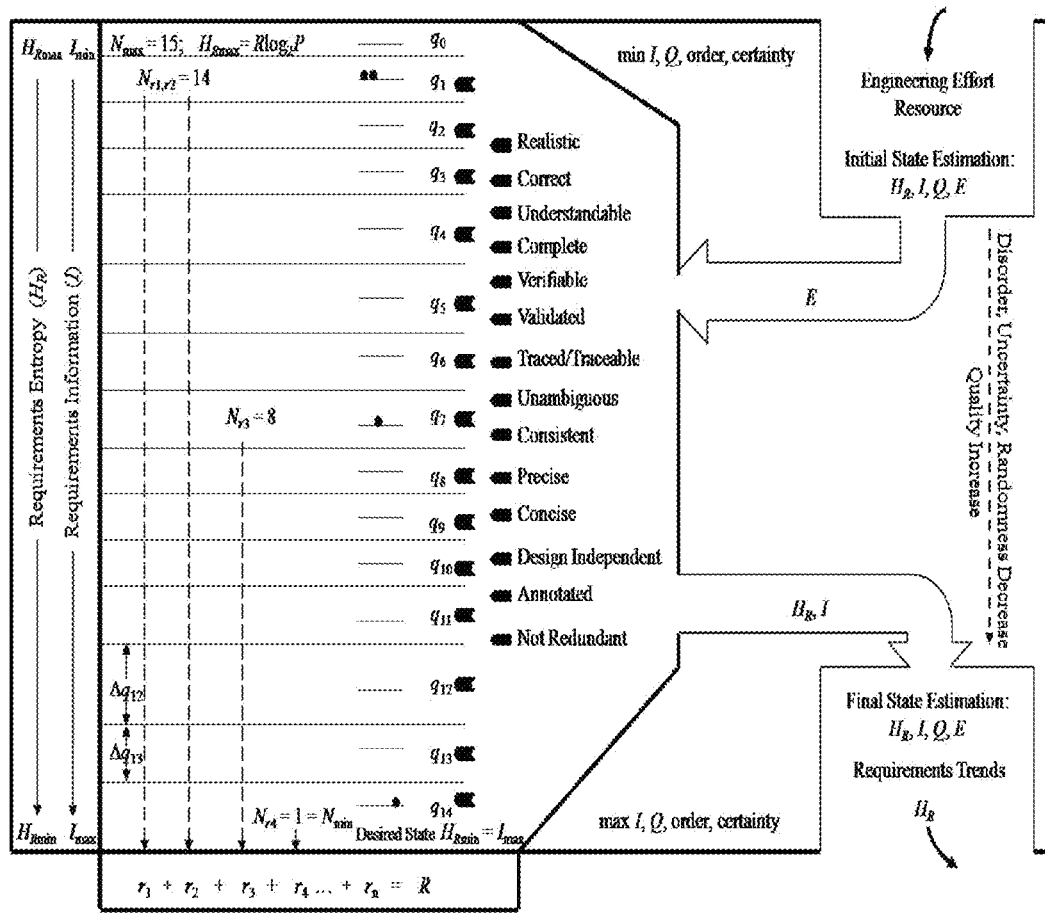
FIG. 7 is a schematic illustration of an example of the information entropy framework (IEF) or requirements entropy framework (REF), herein referred to as the IEF/REF for requirements engineering wherein the number of requirements R occupy levels corresponding to their cumulative quality and transition from an initial high entropy state with low information certainty to lower entropy states with higher information certainty as engineering effort is input and R increase in quality. The number of quality levels and specific quality attributes are illustrative and may be varied to best meet the needs of the organization, effort or process.

A schematic illustration of an example of an IEF/REF of the embodiments described herein is illustrated in FIG. 7. The IEF/REF is analogous to an open system in which entropy may decrease when energy is transported across its boundary. The number of requirements or information statements R is treated as information entities that occupy discrete levels corresponding to their cumulative quality at any given time. For the IEF/REF example illustrated in FIG. 7, the R may occupy any of the N=15 levels having one state per level in this case. N corresponds to the number of quality attributes determined to be important for information quality. The number of quality attributes represents the desired requirement or information quality end state plus one additional state representing zero quality $q_0$. The IEF/REF is completely flexible in this regard. The number of quality attributes and the N may vary and may be tailored to best meet the need of the systems engineering, requirements engineering or information development program.

The IEF/REF illustrated in FIG. 7 shows four requirements: $r_1$ and $r_2$ occupy $q_1$ corresponding to any one quality factor, which represents relatively low requirement quality and high entropy, $r_3$ occupies $q_7$ corresponding to any seven quality factors applying to it and $r_4$ occupies the desired end state $q_{14}$ corresponding to maximum quality with all fourteen quality factors applying to it and minimum requirements entropy $H_{Rmin}$. There is no constraint on the order in which the quality factors may bind or apply to the requirements.

Quantum statistics are used in the IEF/REF to estimate the number of possibilities P for a given set of requirements R where any given quality level $q_n$ can have any number of requirements from zero to R where, for example, in the case with N=15:

$$R=\Sigma_{n=0}^{14} r_n = r_0+r_1+r_3+ \ldots +r_{14} \quad (2)$$

and the total requirements quality Q is defined by:

$$Q=\Sigma_{n=0}^{14} r_n q_n = r_0 q_0+r_1 q_1+ \ldots +r_{14} q_{14} \quad (3)$$

where $r_n$ is the number of requirements that occupy quality level n and $q_n$ is the quality level. The Q represents the cumulative quality macrostate of R at any given time in the requirements engineering or information development process. Quantum statistics are used to estimate the number of ways, or possible distributions, for R among the available quality levels.

According to embodiments disclosed herein, the levels in the IEF/REF are assumed to be discrete and nondegenerate with negligible interactions because there is only one state per quality level and any existing requirement $r_j$ occupying a given quality level has only the current level and higher levels available to it unless change or volatility results in a decrease in the number of quality attributes that apply to $r_j$. According to such embodiments, the focus is on the $H_R$ corresponding to the number of possible microstates available for a given R relative to the desired end state instead of the number of possible microstates corresponding to a particular Q that may include some existing requirements occupying lower quality levels that are otherwise unavailable. In other words, the number of quality levels available to R decreases as requirements quality increases during the requirements engineering or information development process without negative volatility effects, and requirements or information statements are not permitted to randomly or arbitrarily exchange quality or move among the quality levels.

According to embodiments disclosed herein, the implementation of the IEF/REF restricts $H_{Rmin}$ to the desired end state only and enables the status and progress of the requirements engineering or information development effort to be quantified relative to $H_{Rmin}$. The number of possible microstates or distributions available to R that correspond to a particular cumulative quality Q can be estimated by the IEF/REF if there is interest in determining or estimating the degree of uncertainty corresponding to a particular macrostate of R.

A requirement $r_j$ may occupy any quality level $q_n$ corresponding to the number of quality attributes that apply to it. The initial state can range from zero quality when all requirements occupy the minimum quality state, or $R \rightarrow q_0$, to maximum quality when $R \rightarrow q_{14}$ prior to the input of engineering or information development effort E, however unlikely the latter condition may be.

Requirements occupying $q_{14}$ in this example of the IEF/REF have reached the desired end state because all quality attributes apply to it. The $q_{14}$ state has the highest order, stability and certainty and the greatest departure from randomness as illustrated in FIG. 7. Order is departure from randomness, and $q_{14}$ is the least random state because there is only one possibility for requirements occupying it. The $q_{14}$ state has the highest certainty because there is only one possible arrangement, distribution or outcome. Requirements occupying the $q_{14}$ state are least likely to change and are therefore the most stable because they exhibit maximum quality and there is little need for the requirements engineering or information development process to expend effort to change them. Subsequent changes or volatility in other requirements or information statements, such as new requirements or added information, may result in requirements occupying $q_{14}$ to move to a lower quality state depending on the number of quality attributes that no longer apply.

As described above, the number of possibilities P may be estimated using Stirling's approximation:

$$P_{SA} = e^{[\Sigma_{n=0}^{14}(r_n+N-1)\ln(r_n+N-1)-(N-1)\ln(N-1)-r_n \ln r_n]} \quad (4)$$

or the quantum statistics distribution:

$$P_{BE} = \frac{(R+N-1)!}{R!(N-1)!} \quad (5)$$

or similar depending on factors such as whether or not it is appropriate to distinguish the requirements among the quality levels, where in this case $R > N$, and N is the number of higher states available for R to occupy including their current state. For example, if R=4 and all levels are available for R to occupy because $R \to q_0$ and N=15, then there are:

$$P_{BE} = \frac{(4+15-1)!}{4!(15-1)!} = 3060$$

possible ways to arrange the R among the N=15 available states. For R=1000 under the same conditions, the number of possibilities $P_{BE} \approx 4.47 \times 10^{2609}/3.49 \times 10^{2578} = 1.28 \times 10^{31}$. The number of possibilities can be used to express complexity. This example provides some insight into the number of possibilities encountered during the requirements engineering or information development process and the potential utility of the IEF/REF for describing the complexity of the process. As described above, the requirements or information entropy $H_R$ in bits is estimated by:

$$H_R = -r_0 \log_2 \frac{r_0}{RP_0} - \ldots - r_{14} \log_2 \frac{r_{14}}{RP_{14}} = -\sum_{n=0}^{14} r_n \log_2 \frac{r_n}{RP_n} \quad (6)$$

and the maximum requirements or information entropy $H_{Rmax}$ can be estimated using:

$$H_{Rmax} = R \log_2 P \quad (7)$$

$H_{Rmax}$ for the Maxwell-Boltzmann distribution $P_{MB}$ is included for reference in the estimations of engineering effort set forth below and illustrated by the upper bound dashed line in FIGS. 15 and 16.

Additivity is among the properties of entropy. The movement of requirements or information statements among the quality levels during the process enables estimation, measurement, forecasting and monitoring of $H_R$ during the requirements engineering or information development process. For the simple example of four (4) requirements or information statements shown as illustrated in FIG. 7, $H_{Rmax}$=46.3 and $H_R$=22.43. To put this in context, $H_{Rmax}$=103,336 for R=1000. The entropy as a function of time or assessment interval $H_R(t)$ decreases, increases or remains steady depending on the degree of positive or negative impact that additions, deletions or revisions have on the requirements or information statements and therefore their impact on the requirements or information statement quality distribution.

The requirements engineering or information development effort E is the energy that transforms the requirements or information statements from a lower state of quality to a higher state of quality or the desired end state during the requirements engineering or information development process. The change in E is defined as:

$$\Delta E \overset{def}{=} \Delta I Q / \langle b \rangle \quad (8)$$

where $\Delta I$ is the additional information necessary to achieve $H_{Rmin}$ or the desired entropy at a given time or interval for a given R and b is the information output bitrate in bits per unit time. The Q is defined by equation (3) and is the corresponding cumulative quality. The $\Delta I$ to reach the desired end state is calculated by extending the following method:

$$\Delta I = H_R - H_{Rmin} \quad (9)$$

where $H_R$ is defined by equation (6). The initial requirements entropy $H_{Ri}$ can be used to estimate the initial information $I_i$ using:

$$I_i = H_{Rmax} - H_{Ri} \quad (10)$$

where $H_R = H_{Ri}$ at the start of the effort. This in effect baselines the amount of information as reflected by its quality as determined by the relevant quality attributes at the start of the effort. This may be useful to quantify the quality of the source requirements or information at the start of the program and gain insight into the effectiveness of early requirements or information development efforts before the start of the current program or effort. For cases where $R \to q_0$ represents the initial state and $R \to q_{14}$ represents the desired end state, $\Delta I$ is maximum and $I_i$=0. In such a case, $H_R = H_{Ri} = H_{Rmax}$. For systems engineering or information development programs with an initial quality distribution other than $R \to q_0$, $H_{Ri}$ decreases as the initial requirements or information distribution increases in quality, resulting in less $\Delta E$ necessary to transition R from the initial state to the desired state.

The difference in initial quality between new requirements or information statements and those that are reused from previous efforts can be accounted for in the IEF/REF by assuming a higher probability that a quality attribute will initially apply to a given reused requirement or information statement than a new requirement or information statement at the start of the effort.

Figure 8:
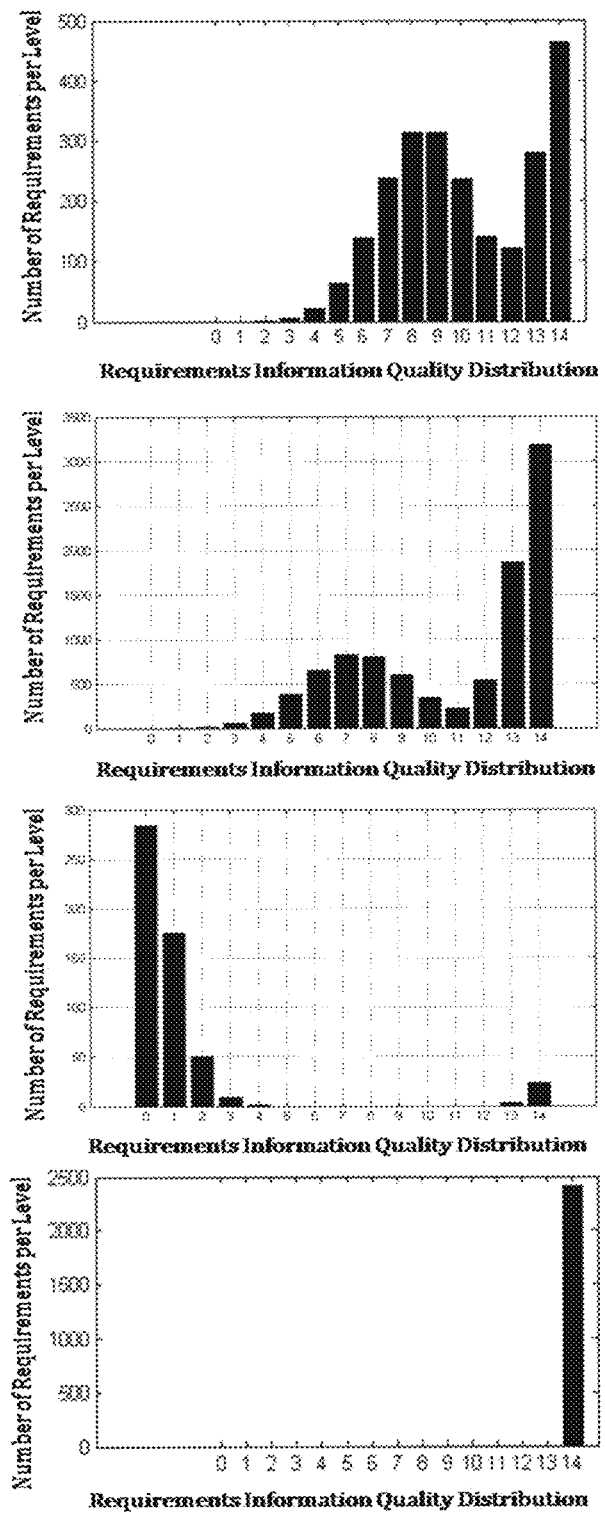
FIG. 8 shows graphical examples of initial state requirements information quality distributions and a desired end state where all information statements have all defined quality attributes.

FIG. 8 shows four examples of requirements or information statement distributions, where the top three distributions correspond to quality less than the desired end state and the bottom distribution corresponds to all requirements for that particular effort occupying the desired end state.

Certain assumptions were made in order to write software code to implement and evaluate the capability and practical utility of the IEF/REF using simulation experiments of requirements trends and engineering effort as described herein, for example, which may be part of requirements information entropy module 138. Such assumptions may not be necessary for the practical application of embodiments in all cases.

One assumption that may be used in certain embodiments disclosed herein is nondegeneracy in the IEF/REF, such that if R=1 and R occupies $q_1$, then N=14 in the calculation of $P_{BE}$ because R would have N=14 possible states available for it to occupy. If R occupies $q_{14}$, then N=1 and P=1 because there is only 1 state available for R to occupy, which is the maximum quality state, and there is only 1 possible distribution of R when all R occupy the maximum quality state. This state corresponds to $H_{Rmin}$ and we assume $H_{Rmin}=0$ because $H_R$ using equation (6) equals zero when P=1 and all requirements or information statements occupy the desired state where $r_{14}=R$. It is not necessary for $H_{Rmin}=0$ to obtain useful results.

A further assumption that may be used in certain embodiments disclosed herein is that R may vary as a function of time as requirements are added or deleted. The Q varies as a function of the cumulative quality of R according to equation (3).

A further assumption that may be used in certain embodiments disclosed herein is that at the start of the requirements engineering or information development process, all requirements or information statements are either new or reused where $R=r_{reuse}+r_{new}$. Additional categories of requirements or information statements may be used to differentiate the degree of uncertainty or quality at the start of the effort.

A further assumption that may be used in certain embodiments disclosed herein is that the initial state quality of $r_{reuse} \gg r_{new}$. Requirements or information statement reuse has been shown to decrease the negative effects of volatility and increase the quality of software. This assumption is extended to the IEF/REF but is not mandatory.

A further assumption that may be used in certain embodiments disclosed herein is that any requirement or information statement that transitions to the maximum quality state $q_{14}$ remains there for the duration of the effort and is therefore stable, unless other changes or volatility results in loss of quality. The requirement or information statement may be deleted if determined to be unnecessary, but the $p(r_{revise})=0$. Revisions are limited to R that occupy quality states other than $q_{14}$.

A further assumption that may be used in certain embodiments disclosed herein is that the probability of a given requirement $r_j$ increasing in quality as a result of the effort is greater than the probability of $r_j$ decreasing in quality. The simulation results disclosed herein permit existing requirements or information statements to only increase in quality as a result of the requirements engineering effort but this is not necessary to obtain useful results. For example, this assumption, in effect, does not account for the possibility of a mistake or a detrimental change to an existing requirement which may occur in practice. The probability of this occurring may be accounted for in the IEF/REF.

A further assumption that may be used in certain embodiments disclosed herein is that requirements or information statements have a probability of transitioning from lower quality level to the next higher quality level per unit time or interval. The probability of transitioning more than one quality level per unit time or interval may decrease according to the specified probability distribution function. This assumption stems from the observation that it is unlikely to transform or transition a requirement or information statement from low quality to maximum quality in a single iteration.

A further assumption that may be used in certain embodiments disclosed herein is that revisions are more likely for $r_{new}$ than $r_{reuse}$, and revisions lead to more $r_{new}$. This assumption stems from observations but is not necessary to obtain useful results.

A further assumption that may be used in certain embodiments disclosed herein is that there is no difference between the probability of $r_{new}$ quality at the start of the effort versus later in the effort. For the purpose of illustration herein, a binomial distribution is used for $p(r_{new})$ and a uniform random variable distribution with a maximum p=0.1 is used for $p(r_{delete})$. Revised requirements or information statements in the IEF/REF are modeled using a normally distributed random variable, with varying $p(r_{revise})$ and $p(r_{new})$ for cases of low and high volatility. These probability distribution functions are illustrative, are assumed for the purpose of the simulations experiments performed and may not necessary to obtain useful results in other requirements engineering or information development cases.

A further assumption that may be used in certain embodiments disclosed herein is that the probability of $r_{reuse}$ or $p(r_{reuse})$ is higher for large scale or complex systems engineering efforts than for smaller efforts because the likelihood of starting from scratch on smaller, less complex systems is higher than on larger, more highly complex systems and systems of systems (SoS), which tend to evolve. The availability of requirements or information statements from previously developed complex systems increase $p(r_{reuse})$ for these programs.

An example of quality attributes that may be important for requirements or information statements to have in order to achieve the desired end state in the IEF/REF is shown in TABLE I. These quality attributes are illustrative and are not intended to limit the relevant number or type of quality attributes that may be important in other engineering or information development efforts. The number of important quality attributes and the specific terminology used for the quality attributes may vary to best meet the needs, experience and characteristics of the organization, personnel, technology, and program.

Table I summarizes the definitions of the illustrative quality attributes used to obtain the results shown herein.

TABLE I

| Quality Attribute | Definition |
| --- | --- |
| 1. Realistic | The requirement can be met within the cost and schedule constraints of the program. |
| 2. Correct | The requirement represents something necessary for the system to be built and satisfaction of some need. |
| 3. Understandable | The meaning of the requirement can be understood with minimal explanation. |
| 4. Complete | The requirement captures everything that is intended with no TBDs or TBRs. |
| 5. Verifiable | The requirement is written in such a way that enables cost effective verification that the system fulfills it. |
| 6. Validated | The requirement is necessary to build the right system and meet user/customer needs. |
| 7. Traced/Traceable | The requirement is allocated and linked to all other supporting requirements at higher and lower levels. |
| 8. Unambiguous | The requirement has only one possible interpretation. |
| 9. Consistent | The requirement is not in conflict with any other requirement. |
| 10. Precise | The requirement numeric quantities are accurate and specified to an appropriate level. |
| 11. Concise | The requirement communicates the information using as few words as possible. |
| 12. Design Independent | The requirement enables flexibility in the design process by defining what is necessary, instead of how it should be designed or implemented. |
| 13. Annotated | The requirement necessity and relative importance is documented. |

TABLE I-continued

| Quality Attribute | Definition |
|---|---|
| 14. Not Redundant | The requirement information is not stated more than once without a good reason to do so. |

A further assumption that may be used in certain embodiments disclosed herein is that the requirements engineering or information development process is an open system. Although the entropy of a closed system can only increase, the entropy of an open system can decrease when energy, such as in the form of engineering or information development effort, is transported across its boundary. In the IEF/REF, this effort is input for the purpose of increasing the quality and meaning of the requirements or information statements.

A further assumption that may be used in certain embodiments disclosed herein is that disordered states are more probable than ordered ones and that the entropy of the state of a system or process is a measure of the probability of the occurrence of a particular state. States of low probability have low entropy while states of high probability have high entropy. This is consistent with the assumptions that a requirement or information statement will be more likely to occupy a low quality state in the IEF/REF than a high quality state, and $q_{14}$ is the lowest probability state and corresponds to $H_{Rmin}$.

A further assumption that may be used in certain embodiments disclosed herein is that the distinguishability between the requirements or information statements within any given quality level of the IEF/REF is not critical because two requirements or information statements at $q_{10}$ may require an equivalent amount of $\Delta E$ to reach $q_{14}$ even though they may not share the same ten (10) quality factors. Therefore, the Bose-Einstein statistical distribution shown in equation may be used. If the requirements engineering or information development effort needs to distinguish between the requirements or information statements to ensure they are appropriately worked or for some other reason, then Maxwell-Boltzmann or other statistics may be used to do so and account for the increased number of possibilities P in the $H_R$ calculation.

The IEF/REF of the embodiments disclosed herein will now be discussed in relation to requirements volatility and trends, which are important indicators of the status and progress of the effort and impact the amount of additional engineering or information development effort necessary to transition or transform the requirements or information statements from their current state of quality to the desired state.

Requirements volatility is often synonymous with requirements change, requirements creep, scope creep, requirements instability, and requirements churn. Requirements or information change is an important objective of a requirements engineering or information development process and is necessary to define a complete set of requirements or information and improve their quality. Changes may be good, detrimental or neutral to the system, requirements or information development effort.

For the purpose herein, requirements or information volatility refers to changes that have detrimental or negative effects, which may be unpredictable in nature. Volatility can result from many factors, such as unpredictable or unexpected changes in customer or user needs or requirements, discovery of hidden or unknown needs or requirements during the process, technology advancement that renders current requirements unacceptable, or unclear understanding of the operational environment in which the system or software will be used to name a few. A major premise of the IEF/REF of the embodiments disclosed herein is that requirements changes can be good, bad or neutral depending on the degree to which additions, revisions and deletions have a positive or negative impact on requirements entropy $H_R$. As the requirements engineering or information development effort progresses, requirements or information are further analyzed, defined, derived, uncovered, added, revised, and deleted as necessary to describe the system, its subsystems and attributes sufficiently for the right system to be designed and built the right way.

Figure 9:
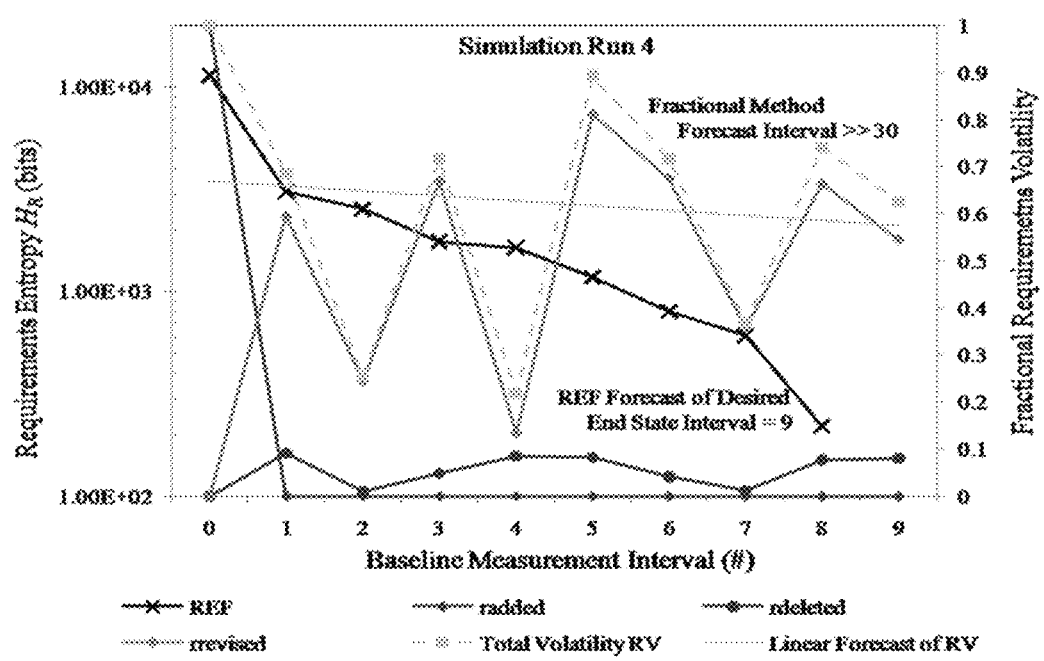
FIG. 9 is a graphical demonstration example that compares the requirements entropy framework of embodiments disclosed herein with the existing Fractional Method forecast of when the requirements volatility will be zero and no additional changes to the requirements are needed, showing a difference of more than 20 baseline measurement intervals in their forecasts.

The Fractional Method appears to infer an increase in requirements quality by simply monitoring the overall decreasing trend in the quantity of additions, deletions or revisions that are made over time. It is important to note in FIG. 9 that requirements revisions become the dominant contributor to requirements volatility at the point where the data end. The overall trend in requirements revisions from program start to baseline measurement interval 5 is actually increasing, and yet the Fractional Method using linear regression forecasts that the RV will reach zero and the program will be ready for a formal review at baseline measurement interval 11. There is little evidence to suggest that the RV trend would reach zero at baseline measurement interval 11. For example, if the increasing trend of requirements revisions in FIG. 8 leads to more volatility because important hidden requirements are uncovered or the scope of the development program increases, which occurs in the majority (0.78) of projects with volatility, then the program may not be ready for a formal review at baseline measurement interval 11. The Fractional Method does not quantify the degree of positive or negative impact that additions, deletions and revisions have on the state of requirements quality relative to the desired end state.

The data shown in FIGS. 9-14 illustrate the potential advantages of the IEF/REF relative to the Fractional Method for estimating, measuring, monitoring and forecasting requirements trends and the impact of requirements volatility on engineering effort. Simulations experiments were run to compare IEF/REF requirements trends and forecasts of when the requirements would reach the minimum entropy state, or $H_{Rmin}$, with the Fractional Method. The Fractional Method simulation data are plotted against the right ordinate with the number of deleted requirements ($r_{deleted}$), revised requirements ($r_{revised}$), added requirements ($r_{added}$), total requirements volatility (RV), and linear regression forecast of the total RV as shown. The IEF/REF requirements entropy $H_R$ simulation data are plotted using black 'x' markers against the left ordinate. Each time interval in the simulation run contains a single data point for each variable representing the cumulative change measured over that baseline measurement interval, which is similar to other data published in the literature. Each baseline measurement represents an iteration of the simulation that baselines the requirements engineering effort at uniform intervals. This simulation assumes there are sufficient engineering resources available to support the number of simulated additions, revisions and deletions per baseline measurement interval. The Fractional Method forecasts are compared in each simulation run to the IEF/REF forecast. The IEF/REF $H_R$ forecast of the desired end state interval shown in each plot corresponds to the baseline measurement interval when the requirements reach the desired end state, $H_{Rmin}$.

In summary, the requirements trend behavior of the simulated Fractional Method data are consistent with behavior previously published in the systems engineering literature. The Fractional Method baseline measurement interval forecast of when the requirements will become stable and not require additional effort is overly optimistic in FIGS. 10, 11, 13, and 14 and overly pessimistic in FIGS. 9 and 12. The simulations shown in FIGS. 9 and 12 have the highest fractional rate of changes per interval and may be interpreted to exhibit negative volatility effects but in fact the high fraction of revisions is transitioning R toward the desired end state more quickly, as evident by the significantly earlier forecast by the IEF/REF of when the requirements will reach the desired end state and not require additional effort to achieve maximum quality.

The simulation results assume that the R do not need to undergo further changes or improvements when the $q_{14}$ state is reached. In effect, the fractional requirements volatility at $H_{Rmin}$ is zero, and this reflects maximum quality in the IEF/REF. The Fractional Method does not account for requirements quality or the degree to which a change has a positive or negative effect on the engineering effort necessary to achieve the desired end state. If it is assumed that requirements or information quality is a good indicator of the status and progress of the requirements engineering or information development effort and zero fractional requirements volatility represents stability, then the mean difference between the Fractional Method and the IEF/REF in their forecast of when the desired state would be reached is 17 baseline measurement intervals for the twenty-four (24) total simulation runs in this experiment. Statistical analysis suggests that there is a significant difference between the Fractional Method and the IEF/REF in their forecast of when R will reach the desired end state and therefore will be stable and not require additional engineering effort.

The IEF/REF provides additional information that is important to the engineering or information development effort that is otherwise not provided by any other available method. The IEF/REF is a new technology for measuring, estimating, monitoring and predicting requirements trends at any given time in the process and the degree of positive, negative or neutral impact of changes on the engineering effort necessary to reach the desired state.

Figure 14:
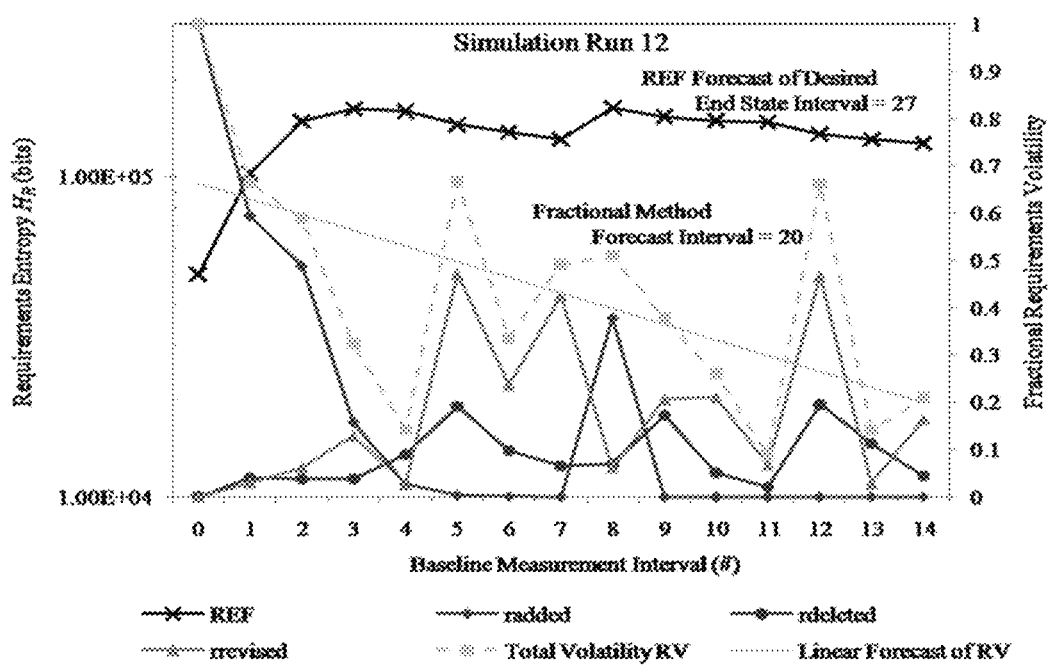
FIG. 14 is a graphical demonstration example that compares the requirements entropy framework of embodiments disclosed herein with the existing Fractional Method forecast of when the requirements volatility will be zero and no additional changes to the requirements are needed, showing that the REF differs from the Fractional Method by 7 baseline measurement intervals.

For the example shown in FIG. 14, R increases from 4410 to 5170 at interval 8. The $H_R$ trend after interval 8 indicates that R is continuing to transition toward the desired end state even though a significant number of requirements were added to the program at interval 8. This insight into the status and progress of the requirements engineering effort is not readily apparent using the Fractional Method. In this example, the revisions are transitioning R toward the desired end state and the process is compensating for the negative effects of volatility from adding a significant number of lower quality new requirements at interval 8. The new entropy metric $H_R$ from the IEF/REF informs the systems engineers, program managers and decision makers whether or not the effort is making steady progress toward the desired end state despite the complex behavior of changes and volatility observed in the Fractional Method data. The information provided by the IEF/REF method decreases uncertainty about the status and progress of the engineering or information development effort, whether or not the requirements changes and volatility are under control and whether or not the requirements engineering or information development effort, or systems engineering program, is progressing toward a set of R with the specified quality attributes according to original schedule estimates.

Accurate estimation of requirements engineering or information development effort is critical for systems engineers, program managers, contractors and decision-makers to properly allocate the resources necessary to complete the requirements engineering or information development process and, in the special case of systems engineering, build the right system to satisfy customer needs. In the Department of Defense, each Major Defense Acquisition Program requires risk mitigation planning that includes a general estimate of the level of effort required to bring the program to a successful conclusion. It has been recognized that in risk mitigation planning there must be enough detail to allow a general estimate of the engineering effort required and technological capabilities needed based on system complexity but little guidance is provided on generally accepted approaches or best practices for estimating, measuring or forecasting requirements engineering effort.

The most recent models known to be currently available to the systems engineering community (e.g. COSYSMO) are generally empirical in nature and are based on equations with effort multipliers and adjustable parameter exponents that require custom calibration from organization to organization to obtain reliable results. In one report requirements engineering effort was measured for thirty-five (35) Department of Defense programs from six (6) different major defense contractors. These published data serve as a basis for comparison of the engineering effort estimated by the IEF/REF. These measured data are shown by the black crosses in FIGS. 15, 16, 17 and 18 and are the same in each simulation. The requirements engineering effort data measured in this report ranges from relatively small system development programs with R≈70 to very large programs with R≈20,000.

The upper bound solid and solid/dashed lines in FIGS. 15, 16, 17 and 18 are the maximum requirements engineering effort estimated by the IEF/REF using Bose-Einstein and Maxwell-Boltzmann statistics, respectively, and assuming an initial state of $H_{Rmax}$. The average information output bitrate $\langle b \rangle$=1 bit per second for these maximum estimates shown in FIGS. 14 and 15, and $\langle b \rangle$=0.1 bits per second for the maximum upper bound estimate shown in FIGS. 16 and 17. These estimates of the maximum expected requirements engineering effort assume R remains constant for the rest of the effort and correspond to the transformation of the initial state R→$q_0$ to the desired end state R→$q_{14}$ where $\Delta I$ is calculated using the difference between the initial state $H_{Ri}$=$H_{Rmax}$ and the final state $H_{Rf}$=$H_{Rmin}$. The IEF/REF $H_{Rmax}$ bounds the high range of the measured data from the report mentioned above well. These assumptions made for the upper bound are illustrative and not intended to suggest that the bitrate, number of quality attributes, number of quality levels or other variable in the IEF/REF is constrained in any way.

Figure 15:
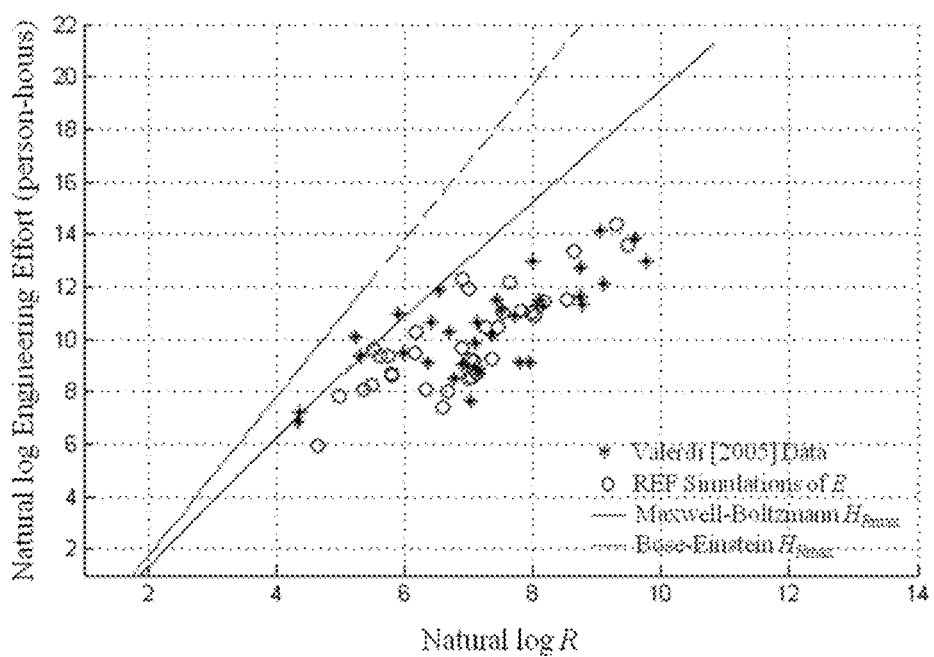
FIG. 15 is a comparison of the REF estimation of engineering effort and measured engineering effort data for DoD programs available in the literature, showing that there is not a statistically significant difference between the mean engineering effort estimated by the REF and the mean engineering effort data measured for DoD programs.
Figure 16:
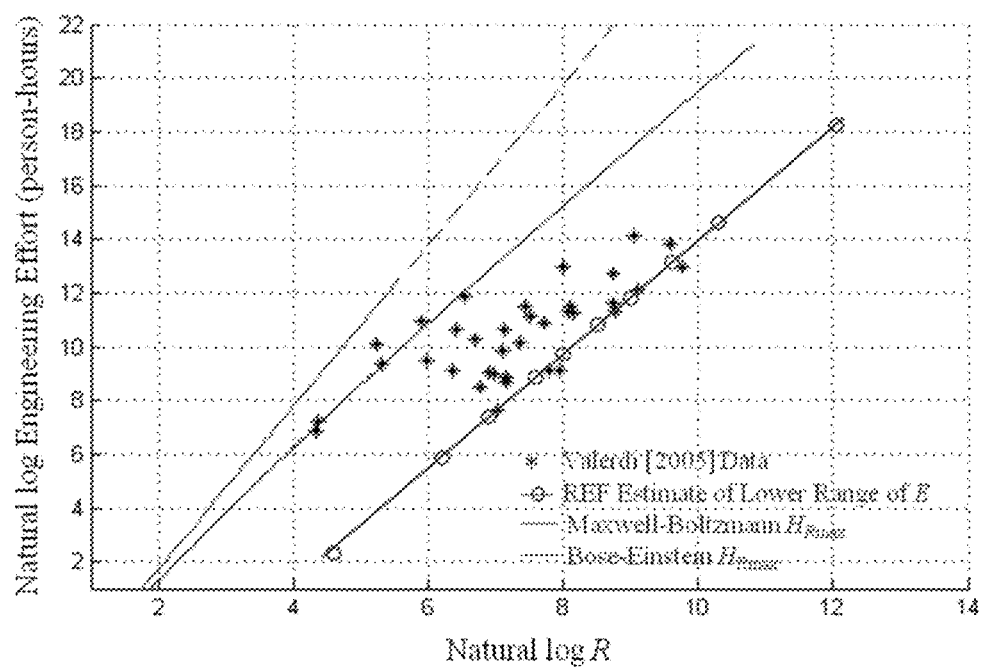
FIG. 16 is a comparison of the REF estimation of engineering effort and measured engineering effort data for DoD programs available in the literature, showing that there is not a statistically significant difference between the mean engineering effort estimated by the REF and the mean engineering effort data measured for DoD programs.
Figure 17:
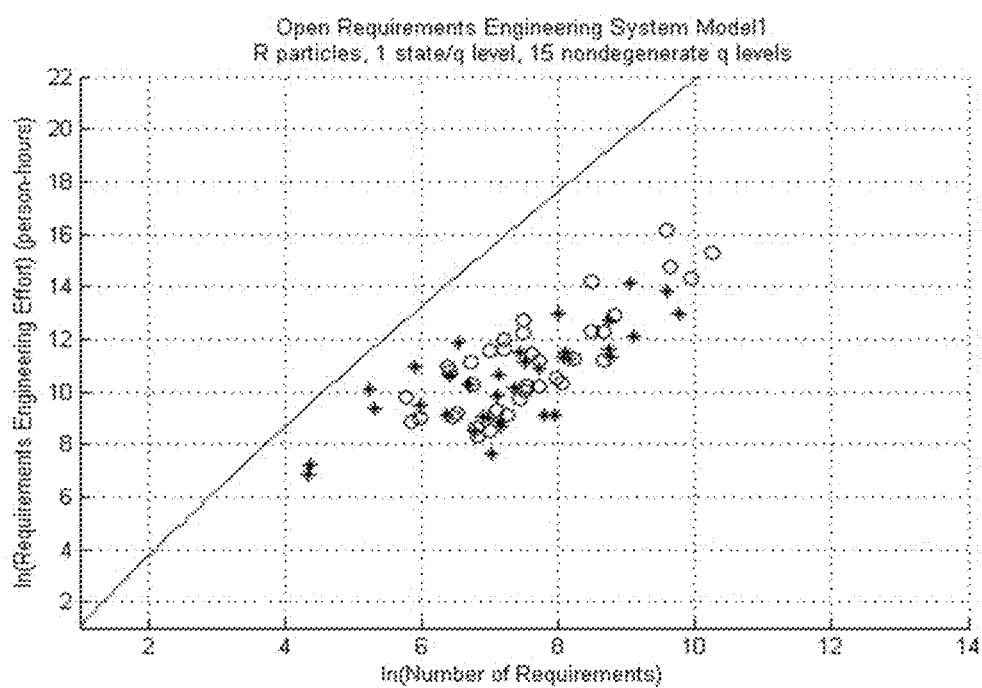
FIG. 17 is a comparison of the REF estimation of engineering effort and measured engineering effort data for DoD programs available in the literature, showing that there is not a statistically significant difference between the mean engineering effort estimated by the REF and the mean engineering effort data measured for DoD programs.
Figure 18:
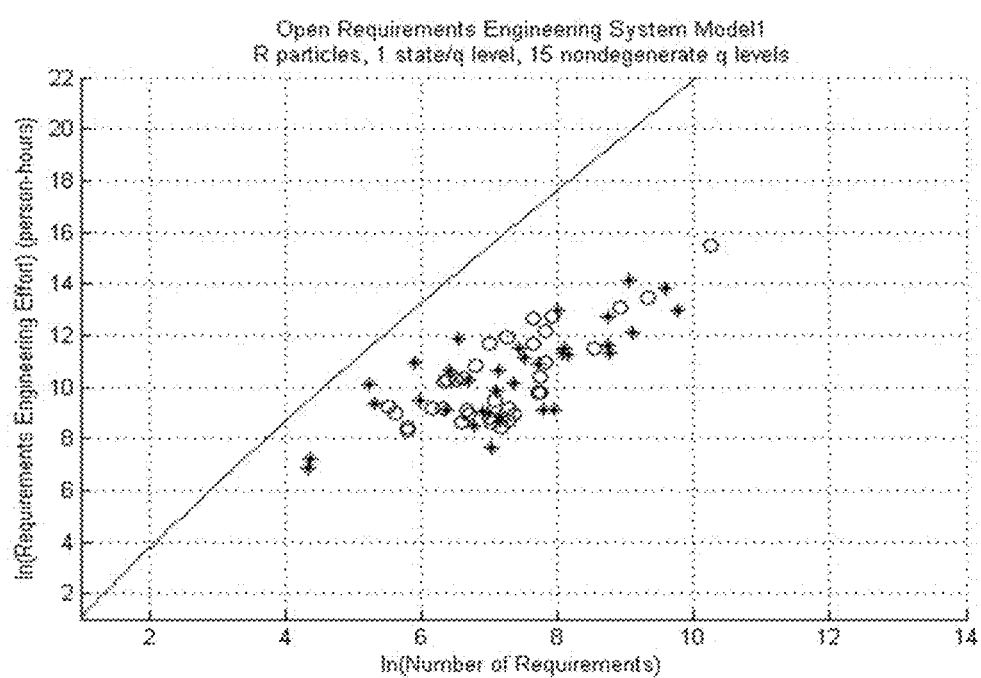
FIG. 18 is a comparison of the REF estimation of engineering effort and measured engineering effort data for DoD programs available in the literature, showing that there is not a statistically significant difference between the mean engineering effort estimated by the REF and the mean engineering effort data measured for DoD programs.

The initial state requirements quality distributions used for the IEF/REF simulations in FIGS. 15, 17 and 18 were estimated by randomly generating the total number of requirements R using the mean and standard deviation of the measured data as inputs and randomly generating $p(r_{reuse})$ and therefore the number of reused versus new requirements that comprise R in each simulation. The R and the number of new and reused requirements may be manually input or randomly generated in the IEF/REF.

When the R and the number of new and reused requirements have been determined, they are distributed among the quality levels according to the selected probability distribution function of having a quality attribute. In this case and for the purpose of these simulations, the number of quality levels N=15 and it was assumed that the reused requirements have a higher probability of a quality factor applying to them than new requirements. It may be assumed that systems engineering programs with a higher $p(r_{reuse})$ at the start also have a higher probability of $r_{new}$ quality because the experience on previous system development programs of a similar nature result in a better understanding the new system requirements. Examples of initial state requirements quality distributions are shown in FIG. 7. The top three (3) plots in FIG. 7 are examples of how different probabilities of a quality attribute applying to a requirement depending on whether it is new or reused may impact the overall requirements quality distribution at the start of the engineering effort.

Once the initial state requirement quality distribution is determined, $H_R$ and $\Delta I$ are calculated using equations 6 and 9, respectively. The $\Delta I$ in bits is converted into time units using an estimated output rate of the requirements engineering effort, which may vary from organization to organization and among systems engineering teams from program to program.

The black circles shown in FIGS. 15, 17 and 18 are the simulated IEF/REF estimations of $\Delta E$ that were randomly generated for comparison with the measured engineering effort data (black crosses). The $\Delta E$ was estimated by randomly generating initial requirements quality distributions and calculating the $\Delta E$ necessary to transition these requirements to the desired end state using equation (8). These simulations assumed that R remains constant for the remainder of the effort and therefore represents the R in the desired end state for each simulation, however this is not necessary to obtain useful results.

Figure 10:
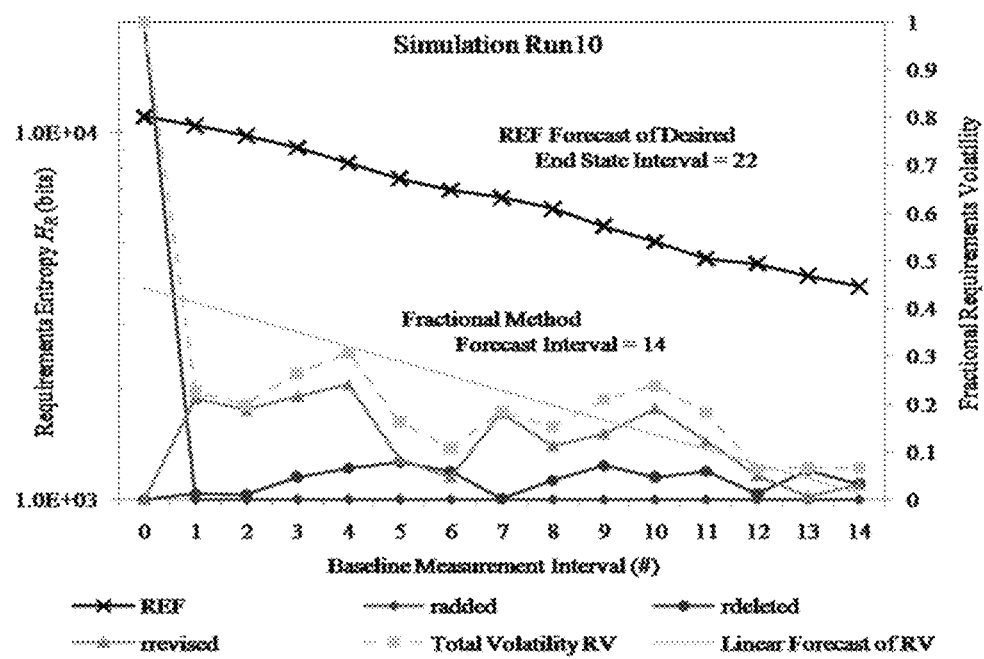
FIG. 10 is a graphical demonstration example that compares the requirements entropy framework of embodiments disclosed herein with the existing Fractional Method forecast of when the requirements volatility will be zero and no additional changes to the requirements are needed, showing a difference of 8 baseline measurement intervals in their forecasts.
Figure 11:
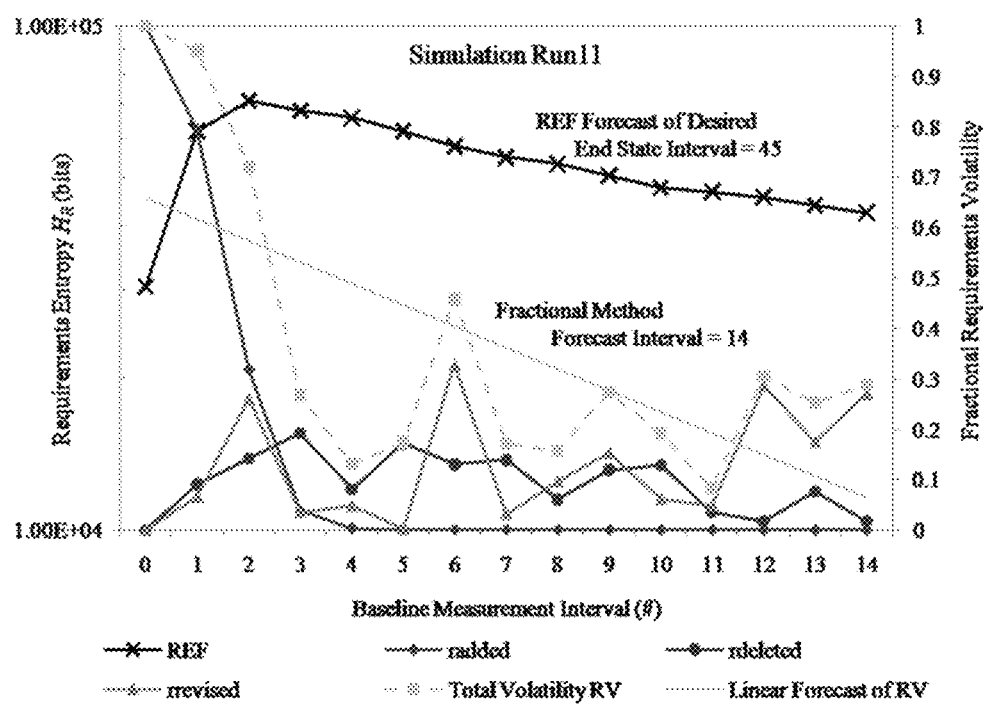
FIG. 11 is a graphical demonstration example that compares the requirements entropy framework of embodiments disclosed herein with the existing Fractional Method forecast of when the requirements volatility will be zero and no additional changes to the requirements are needed, showing that the REF forecasts R will become stable 2.6 times later than the Fractional Method.
Figure 12:
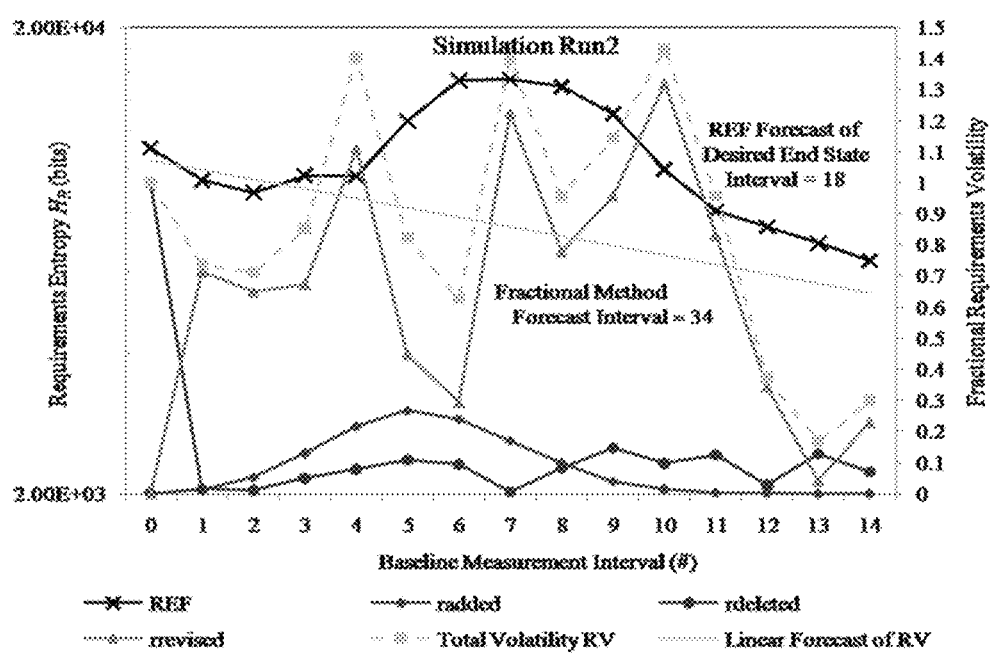
FIG. 12 is a graphical demonstration example that compares the requirements entropy framework of embodiments disclosed herein with the existing Fractional Method forecast of when the requirements volatility will be zero and no additional changes to the requirements are needed, showing that the REF forecasts R will become stable approximately 2 times earlier than the Fractional Method. The data shown in FIGS. 4-9 support the conclusion that there is a statistically significant difference between the REF and the Fractional Method in their forecasts of when the requirements will become stable.
Figure 13:
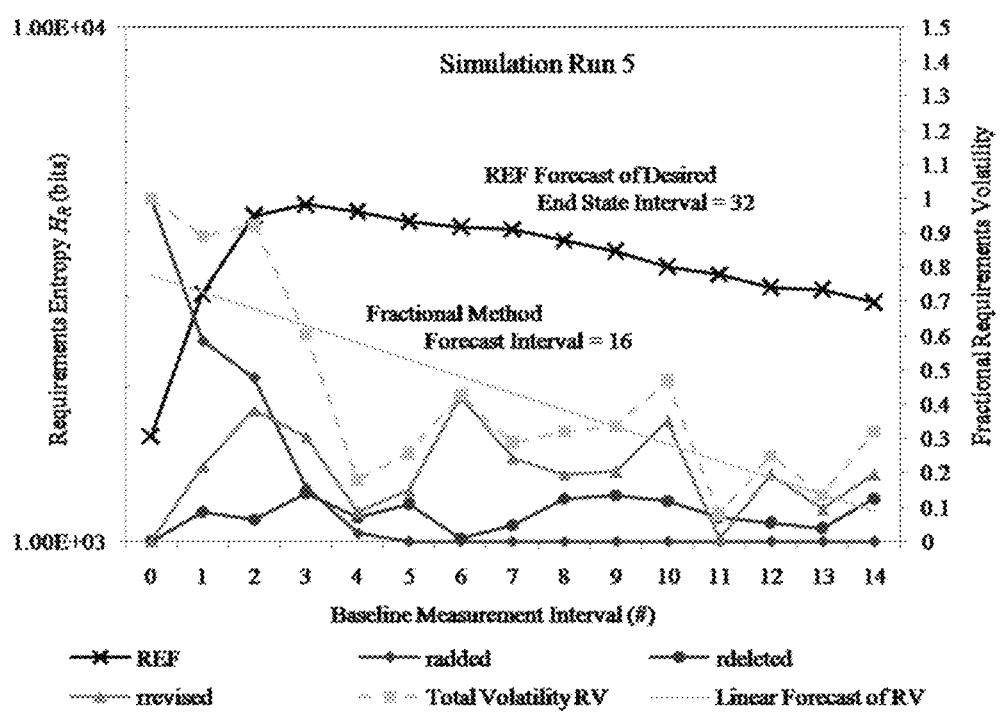
FIG. 13 is a graphical demonstration example that compares the requirements entropy framework of embodiments disclosed herein with the existing Fractional Method forecast of when the requirements volatility will be zero and no additional changes to the requirements are needed, showing that the REF forecasts R will become stable 2 times later than the Fractional Method.

In order to run the simulation experiments and compare the requirements engineering effort measured according to the report mentioned above with the $\Delta E$ estimated by the IEF/REF, the mean of the natural log of R (7.29) and standard deviation ($\sigma=1.3264$) of the data from the report mentioned above were used to randomly generate R in the IEF/REF using the lognormal distribution. The systems engineering programs generated by the IEF/REF simulations range in size from R=80 to 15,000 as shown in FIGS. 10, 12 and 13.

Statistical analysis of the mean $\Delta E$ estimated by the IEF/REF was compared in each case with the mean requirements engineering effort estimated from the measured data from the report mentioned above is 10.447 ($\sigma=1.775$). Results of this analysis suggest that there is not a statistically significant difference between the $\Delta E$ estimated by the IEF/REF and the requirements engineering effort measured according to the report mentioned above for nine (9) different simulation experiments ($p<0.05$).

These findings suggest that the IEF/REF is a new technology and viable quantitative method for estimating, measuring, monitoring and forecasting requirements engineering effort. The input parameters required for the IEF/REF can be measured or estimated at the start of the program or any other point by the systems engineer, program manager or decision-maker and can be updated continuously to monitor the status and progress of the effort.

A comparison between an estimated lower range of $\Delta E$ of DoD program data from the systems engineering report mentioned above is shown by the black circles in FIG. 14. This lower bound was estimated using a high probability that a given requirement $r_j$ will have a quality factor apply to it at the start of the program. This case may reflect an incremental improvement or a minor upgrade program with very high requirements reuse and high requirements or information certainty.

It has been acknowledged elsewhere that the effects of volatility and reuse have been deferred in other models used to estimate engineering effort (e.g. COSYSMO) because of the difficulty in gathering data to calibrate them. The IEF/REF accounts for the effects of new and reused requirements in terms of the probability that a quality attribute will apply to it at the beginning or at any other point in the program when such a requirement is added. The probability of R having higher quality and lower $H_R$ increases as the number of reused requirements increases. The IEF/REF accounts for the positive, negative and neutral effects of requirements changes, and the negative impact of requirements volatility, in the entropy calculation which reflects the requirements quality distribution. There are many variants of the requirements entropy equation (6) that may be used to obtain similar results, and the IEF/REF of this invention is not limited to the entropy shown in equation (6).

The number of bits necessary to communicate the system requirements is far less important than requirements quality. Two engineers may differ in the number of bits needed to communicate a set of R, but there should be general agreement when R meets the quality attributes, one of which is 'concise'. Assuming that an inflexible constraint on the size of the system requirements document (SRD) does not exist, the number of bits is far less important than whether or not the SRD contains all the information necessary for the right system to be designed and built the right way.

The simulation results suggest that the IEF/REF is an improved engineering method for estimating, measuring, monitoring and forecasting requirements trends and the impact of requirements changes and volatility on engineering effort because the IEF/REF measures the quantity of changes and the degree to which those changes increase, decrease or have no effect on $H_R$ relative to the desired state of requirements quality. The IEF/REF is inherently flexible and can accommodate any number of quality attributes and therefore quality levels that a given systems engineering team or practitioner may determine to best meet their needs. The IEF/REF is applicable to systems engineering, software engineering and information development efforts.

The simulation results summarized herein also demonstrate that the IEF/REF is a useful quantitative method for estimating, measuring, monitoring and forecasting engineering effort at any given time in the requirements engineering or information development process. The results demonstrate the potential value of the IEF/REF in addressing limitations of methods currently in use and improving assessment of the status and progress of the requirements engineering effort. Successful technologies are predicated on precise engineering, which in turn requires high precision measurement. The simulation results presented herein show that the IEF/REF is a more precise measure and leading indicator of requirements trends because the IEF/REF distinguishes between the positive, negative or neutral effects of requirements volatility relative to the desired end state or some other interim state of interest.

Results from random variable simulations show that there is not a statistically significant difference between the mean engineering effort estimated by the IEF/REF and the mean engineering effort measured for Department of Defense programs. The IEF/REF implements a new theory of fundamental underlying properties contributing to the macroscopic behavior and collective experience observed during the requirements engineering process in systems engineering programs.

Improved systems engineering methods are needed to improve systems engineering performance in complex system development programs. The IEF/REF would benefit experienced systems engineering practitioners in industry and government as well as scientists and engineers in Research, Development and Engineering Centers (RDECs) and other R&D organizations responsible for implementing systems engineering earlier in the System Development Lifecycle. The IEF/REF would also benefit scientists and engineers in academia and R&D organizations who are interested in a method with a more solid theoretical foundation and mathematical equations to guide them. The R&D community may find the IEF/REF more appealing than heuristics or best practices without underlying mathematical equations.

The difficulty of the requirements engineering process is expected to increase in the future as the systems it is intended to define become increasingly integrated, lateral and complex. The IEF/REF was developed to address this complexity in a practical way by accounting for the number of requirements or information statement possibilities relative to the desired end state. The IEF/REF may be used to facilitate any requirements engineering or information development process that includes requirements or information quality among its objectives.

The IEF/REF of the embodiments disclosed herein represents a first step toward a new complementary way of thinking about the requirements engineering or information development problem. A practical framework similar to the IEF/REF is not known to exist. The IEF/REF can be readily combined with the Fractional Method or other current methods to better understand process-specific or organization-specific requirements engineering or information development problems and, as a result, support the development of tailored solutions that improve the effectiveness and efficiency of the requirements engineering or information development effort.

The foregoing description, examples and embodiments described herein are for illustrative purposes only without limiting it thereby. It should be understood that various modifications or changes in requirements quality or information meaningfulness thereof will be suggested to persons knowledgeable or skilled in the art and such modifications or changes are to be included within the spirit and purview of this invention without departing from the scope thereof.

What is claimed is:

1. An information system for managing requirements for an existing or proposed objective system, the information system comprising:
   one or more processors; and
   storage coupled to the one or more processors, the storage configured to represent underlying requirements data, the requirements data comprising one or more requirements for the objective system, the storage further configured to represent a particular state of the requirements data specified for the objective system, including a plurality of constituent subsystems of the objective system, wherein the particular state of the requirements data specified for the objective system comprises a particular discrete information quality level for each requirement in the requirements data represented in the storage;
   a user interface, implemented on the one or more processors, whereby discrete information quality levels for one or more requirements in the requirement data are modifiable, wherein the modification comprise an updated particular state of the requirements data; and
   wherein the one or more processors are programmed to calculate, from the particular state of the requirements data and discrete information quality level for each requirement, a requirements information entropy metric, $H_R$, for the particular state, and based on the requirements information entropy metric, to calculate an additional information increment $\Delta I$, wherein $\Delta I$ represents an amount of additional information necessary to transform the requirements data from the particular state of the requirements data to a desired state of the requirements data, and calculate, in correspondence with modified discrete information quality levels, an updated requirements information entropy metric, $H_R$, corresponding to the updated particular state of the requirements data.

2. The information system of claim 1, wherein the one or more processors are further programmed to calculate a measure of additional engineering effort $\Delta E$, wherein $\Delta E$ represents an amount of system engineering effort required to transition the requirements information entropy metric $H_R$ to a desired state of the underlying requirements data and particular discrete information quality levels for each requirement.

3. The information system of claim 2, wherein the one or more processors are further programmed to calculate a total requirements quality Q, and calculate therefrom, the additional engineering effort $\Delta E$.

4. The information system of claim 1, wherein the one or more processors are further programmed to calculate, based on the requirements information entropy metric $H_R$, a forecast of when the desired state will be reached.

5. The information system of claim 1, wherein the one or more processors are further programmed to calculate, based on the requirements data, a maximum requirements entropy metric $H_{Rmax}$.

6. The information system of claim 1, wherein each requirement in the requirements data represented in the storage is characterized by one of fifteen discrete information quality levels.

7. A computer-implemented method for managing requirements for an existing or proposed objective system, comprising:
   receiving, by one or more processors, a particular state of underlying requirements data for the objective system, the requirements data comprising one or more requirements for the objective system, including a plurality of constituent subsystems of the objective system, wherein the particular state of the underlying requirements data comprises a particular discrete information quality level for each requirement for the objective system;
   providing, by one or more processors, a user interface whereby discrete information quality levels for one or more requirements in the requirement data are modifiable, wherein the modification comprises an updated particular state of the requirements data;
   calculating, by the one or more processors, from the particular state of the underlying requirements data and the particular discrete information quality levels for each requirement for the objective system, a requirements information entropy metric, HR, for the particular state;
   calculating, by the one or more processors and based on the requirements information entropy metric, an additional information increment $\Delta I$, wherein $\Delta I$ represents an amount of additional information necessary to transform the requirements data from the particular state of the requirements data to a desired state of the requirements data; and calculating, by the one or more processors, in correspondence with modified discrete information quality levels, an updated requirements information entropy metric, $H_R$, corresponding to the updated particular state of the requirements data.

8. The computer-implemented method of claim 7, further comprising calculating, by the one or more processors, a measure of additional engineering effort $\Delta E$, wherein $\Delta E$ represents an amount of system engineering effort required to transition the requirements information entropy metric $H_R$ to a desired state of the underlying requirements data and particular discrete information quality levels for each requirement.

9. The computer-implemented system of claim 8, further comprising calculating, by the one or more processors, a total requirements quality Q, and wherein the additional engineering effort $\Delta E$ is calculated based on the total requirements quality Q.

10. The computer-implemented method of claim 8, further comprising calculating, by the one or more processors, based on the requirements information entropy metric $H_R$, a forecast of when the desired state of the underlying requirements data and particular discrete information quality levels for each requirement will be reached.

11. The computer-implemented method of claim 8, further comprising calculating, based on the requirements data, a maximum requirements entropy metric $H_{Rmax}$.

12. A non-transitory machine-readable medium encoding a plurality of machine-readable instructions which, when executed by one or more processors, are adapted to cause the one or more processors to perform the method for managing requirements for an existing or proposed objective system of claim 7.

13. An apparatus for managing requirements for an existing or proposed objective system, comprising:
   means for receiving a particular state of underlying requirements data for the objective system, the requirements data comprising one or more requirements for the objective system, including a plurality of constituent subsystems of the objective system, wherein the particular state of the underlying requirements data comprises a particular discrete information quality level for each requirement for the objective system;
   means for providing a user interface whereby discrete information quality levels for one or more requirements in the requirement data are modifiable, wherein the modification comprises an updated particular state of the requirements data;
   means for calculating from the particular state of the underlying requirements data and the particular discrete information quality levels for each requirement for the objective system, a requirements information entropy metric, $H_R$, for the particular state;
   means for calculating, based on the requirements information entropy metric, an additional information increment $\Delta I$, wherein $\Delta I$ represents an amount of additional information necessary to transform the requirements data from the particular state of the requirements data to a desired state of the requirements data; and
   means for calculating, in correspondence with modified discrete information quality levels, an updated requirements information entropy metric, $H_R$, corresponding to the updated particular state of the requirements data.

14. The apparatus of claim 13, further comprising means for calculating a measure of additional engineering effort $\Delta E$, wherein $\Delta E$ represents an amount of system engineering effort required to transition the requirements information entropy metric $H_R$ to a desired state of the underlying requirements data and particular discrete information quality levels for each requirement.

15. The apparatus of claim 14, further comprising means for calculating a total requirements quality Q, and wherein the additional engineering effort $\Delta E$ is calculated based on the total requirements quality Q.

16. The apparatus of claim 13, further comprising means for calculating, based on the requirements information entropy metric $H_R$, a forecast of when the desired state of the underlying requirements data and particular discrete information quality levels for each requirement will be reached.

17. The apparatus of claim 13, further comprising means for calculating, based on the requirements data, a maximum requirements entropy metric $H_{Rmax}$.

* * * * *